United States Patent
Doi

(10) Patent No.: US 8,589,059 B2
(45) Date of Patent: Nov. 19, 2013

(54) VEHICLE WITH INCLINATION ESTIMATION

(75) Inventor: Katsunori Doi, Nagoya (JP)

(73) Assignee: Equos Research Co., Ltd., Anjo (JP)

(*) Notice: Subject to any disclaimer, the term of this patent is extended or adjusted under 35 U.S.C. 154(b) by 78 days.

(21) Appl. No.: 13/145,701

(22) PCT Filed: Jan. 22, 2010

(86) PCT No.: PCT/JP2010/000359
§ 371 (c)(1),
(2), (4) Date: Nov. 8, 2011

(87) PCT Pub. No.: WO2010/084762
PCT Pub. Date: Jul. 29, 2010

(65) Prior Publication Data
US 2012/0046856 A1    Feb. 23, 2012

(30) Foreign Application Priority Data

| Jan. 26, 2009 | (JP) | 2009-014144 |
| Jan. 26, 2009 | (JP) | 2009-014157 |
| Mar. 11, 2009 | (JP) | 2009-057640 |
| Mar. 11, 2009 | (JP) | 2009-057650 |

(51) Int. Cl.
*G06G 7/70* (2006.01)

(52) U.S. Cl.
USPC .......................................... 701/124; 701/1

(58) Field of Classification Search
USPC ................. 701/36–38, 124, 1; 180/7.1
See application file for complete search history.

(56) References Cited

U.S. PATENT DOCUMENTS

| 8,160,794 B2 * | 4/2012 | Fuwa ............................... 701/70 |
| 2009/0138232 A1 | 5/2009 | Fuwa et al. |
| 2010/0070132 A1 | 3/2010 | Doi |
| 2011/0010066 A1 | 1/2011 | Fuwa |

FOREIGN PATENT DOCUMENTS

| JP | A-2004-129435 | 4/2004 |
| JP | A-2008-18931 | 1/2008 |
| JP | A-2008-89531 | 4/2008 |
| JP | A-2009-12720 | 1/2009 |

OTHER PUBLICATIONS

International Search Report mailed Apr. 27, 2010 issued in International Patent Application No. PCT/JP2010/000359 (with translation).
International Preliminary Report on Patentability issued Aug. 9, 2011 in International Patent Application No. PCT/JP2010/000359.

* cited by examiner

*Primary Examiner* — Yonel Beaulieu
(74) *Attorney, Agent, or Firm* — Oliff & Berridge, PLC

(57) ABSTRACT

When measurements by sensors are impossible, the angular position of the vehicle is estimated from the conditions including rotation of the drive wheel and the driving torque so that the vehicle may travel in an inverted-pendulum position even in case of a failure of measurements of the vehicular position of angle. To achieve the object, the vehicle has a drive wheel rotatably mounted beneath a vehicular body, and a control unit that controls the vehicular position of angle through control of drive torque imparted to the drive wheel. The control unit has a means to estimate the vehicular angular position with respect to a vertical position from the conditions of rotation of the drive wheel and the driving torque.

12 Claims, 18 Drawing Sheets

VEHICLE WITH INCLINATION ESTIMATION

TECHNICAL FIELD

The present invention relates to a vehicle using posture control of an inverted pendulum.

BACKGROUND ART

Techniques have been proposed relating to vehicles using posture control of an inverted pendulum. For example, techniques have been proposed in which a vehicle includes two coaxially disposed drive wheels and is driven through sensing of a change in posture of a vehicle body as a result of a center of gravity of a driver being moved, and a vehicle moves while controlling posture of a vehicle body mounted on a single spherical drive wheel (see, for example, Patent Document 1).

In this case, motion of the drive wheel is controlled using a sensor that detects balance and an operating condition of the vehicle body to thereby stop or move the vehicle.

RELATED-ART DOCUMENT

Patent Document

Patent Document 1: Japanese Patent Application Publication No. JP-A-2004-129435

DISCLOSURE OF THE INVENTION

Problem to be Solved by the Invention

In the related art vehicles, the posture of the vehicle body is controlled using a measured value of an inclination condition of the vehicle body acquired by the sensor. However, if the measured value cannot be acquired or the measured value acquired is abnormal due to a sensor failure or a communication error, control of inverted posture of the vehicle body can no longer continue, so that the control is forced to be immediately interrupted to thereby tilt and ground the vehicle body.

In preparation for such a situation, it is conceivable that a plurality of sensors and communication means are prepared in advance. However, providing a plurality of sensors and communication means makes a system costly and complicated. Specifically, it is difficult for a low-priced, simple system to assure sufficient safety and convenience.

It is an object of the present invention to solve the above-described problems of the related art vehicles and to provide a safer, more convenient, and lower-priced vehicle that is capable of maintaining running in inverted posture even under a condition in which the inclination condition of the vehicle body cannot be acquired, by estimating the inclination condition of the vehicle body from the rotational condition of the drive wheel and the drive torque if the measured value cannot be acquired by a sensor.

Means for Solving the Problems

To achieve the object above, a vehicle according to the present invention includes a drive wheel rotatably attached to a vehicle body and a vehicle controller that controls posture of the vehicle body by controlling drive torque applied to the drive wheel, wherein the vehicle controller includes inclination estimating means for estimating an inclination angle of the vehicle body relative to a vertical axis using a rotational condition of the drive wheel and the drive torque.

In another vehicle according to the present invention, additionally, the vehicle controller determines the drive torque applied to the drive wheel using an estimated value of the inclination angle of the vehicle body estimated by the inclination estimating means.

In still another vehicle according to the present invention, additionally, the vehicle controller further includes target value determining means for determining a target value of the inclination angle of the vehicle body in accordance with a target movement of the vehicle, and the drive torque is applied with a magnitude proportional to a difference between the estimated value estimated by the inclination estimating means and the target value determined by the target value determining means.

In another vehicle according to the present invention, additionally, the vehicle controller further includes inclination measuring means for measuring the inclination angle of the vehicle body and determining means for determining whether it is possible to acquire a measured value measured by the inclination measuring means and/or to use the measured value for control of the vehicle, and the inclination estimating means estimates the inclination angle of the vehicle body if the determining means determines that the acquisition and/or the use of the measured value is impossible.

In still another vehicle according to the present invention, additionally, the vehicle controller determines the drive torque using the measured value of the inclination angle of the vehicle body if the determining means determines that the acquisition and/or the use of the measured value is possible, and the vehicle controller determines the drive torque using the estimated value of the inclination angle of the vehicle body if the determining means determines that the acquisition and/or the use of the measured value is impossible.

In yet another vehicle according to the present invention, additionally, the vehicle controller applies the drive torque with a magnitude proportional to a difference between the measured value and the target value of the inclination angle of the vehicle body if the determining means determines that the acquisition and/or the use of the measured value is possible, and the drive torque with a magnitude proportional to a difference between the estimated value and the target value of the inclination angle of the vehicle body if the determining means determines that the acquisition and/or the use of the measured value is impossible.

In yet another vehicle according to the present invention, additionally, the vehicle controller further includes center-of-gravity deviation amount acquiring means for acquiring a center-of-gravity position deviation amount of the vehicle body, and the inclination estimating means corrects the estimated value of the inclination angle of the vehicle body using the center-of-gravity deviation amount acquired by the center-of-gravity deviation amount acquiring means.

In yet another vehicle according to the present invention, additionally, the center-of-gravity deviation amount acquiring means estimates the center-of-gravity deviation amount using the rotational condition of the drive wheel and/or the drive torque and/or the measured value of the inclination angle of the vehicle body.

In yet another vehicle according to the present invention, additionally, the center-of-gravity deviation amount acquiring means determines the latest center-of-gravity deviation amount when the determining means determines that the acquisition and/or the use of the measured value is possible to be the center-of-gravity deviation amount if the determining means determines that the acquisition and/or the use of the measured value is impossible.

In yet another vehicle according to the present invention, additionally, the vehicle controller further includes inclination angular acceleration estimating means for estimating inclination angular acceleration of the vehicle body using the rotational condition of the drive wheel and the drive torque, and the estimated value of the inclination angle of the vehicle body is corrected using an estimated value of the inclination angular acceleration estimated by the inclination angular acceleration estimating means.

In yet another vehicle according to the present invention, additionally, the vehicle controller further includes resistance parameter acquiring means for acquiring a parameter relating to running resistance of the vehicle, and the inclination estimating means corrects the estimated value of the inclination angular acceleration using the resistance parameter acquired by the resistance parameter acquiring means.

In yet another vehicle according to the present invention, additionally, the resistance parameter acquiring means estimates the resistance parameter using the rotational condition of the drive wheel and/or the drive torque and/or the measured value of the inclination angle of the vehicle body.

In yet another vehicle according to the present invention, additionally, the resistance parameter acquiring means determines the latest resistance parameter when the determining means determines that the acquisition and/or the use of the measured value is possible to be the resistance parameter if the determining means determines that the acquisition and/or the use of the measured value is impossible.

Effects of the Invention

In the configuration according to claim 1, the vehicle body inclination angle is estimated from the rotational condition of the drive wheel or the drive torque based on a dynamic model. Running in inverted posture can therefore be maintained without using the measured value measured by a vehicle body posture sensor.

In the configuration according to claim 2, the magnitude of the drive torque is determined in accordance with the estimated value of the vehicle body inclination angle, which allows drive torque with a magnitude appropriate for maintaining the inverted posture to be applied.

In the configuration according to claim 3, the use of a simple technique similar to general feedback control using a vehicle body posture sensor reduces arithmetic operation load during control and facilitates design of a control system.

In the configuration according to claim 4, running in inverted posture can be maintained even if acquisition of the measured value of the vehicle body inclination angle suddenly becomes impossible due to, for example, a sensor failure and a communication error. In addition, it is possible to prevent an increase in calculating cost involved in an unnecessary process for acquiring the estimated value when the measured value can be acquired.

In the configuration according to claim 5, a situation requiring the estimated value is appropriately identified to thereby change from the measured value to the estimated value, so that control accuracy can be prevented from being degraded as a result of using the estimated value that is typically less accurate than the measured value, specifically, ride comfort or operability can be prevented from being degraded.

In the configuration according to claim 6, in vehicle body posture control, a control technique is employed that is common between the case in which the measured value is used and the case in which the estimated value is used, so that the control technique can be simplified and the number of man-hours required for designing the control system can be reduced.

In the configuration according to claim 7, by taking into consideration deviation in a center-of-gravity position of the vehicle body, degradation of accuracy in estimating the vehicle body inclination angle as a result of a difference in weight or riding posture of an occupant, or weight or a loading position of an article loaded can be prevented.

In the configuration according to claim 8, the deviation amount of the center-of-gravity position of the vehicle body is acquired through estimation, so that effects from the deviation in the center-of-gravity position can be compensated for without adding a device for measuring the center-of-gravity position.

In the configuration according to claim 9, on the assumption that there is no sudden change in the center-of-gravity position of the vehicle body, the estimated value of the center-of-gravity deviation is fixed when acquisition of the measured value of the vehicle body inclination angle becomes impossible. This allows effects from deviation in the center-of-gravity position to be reduced to some extent without acquiring the center-of-gravity deviation amount, acquisition of which is difficult without the measured value of the vehicle body inclination angle.

In the configuration according to claim 10, the vehicle body inclination angular acceleration is estimated using another dynamic model, so that calculation for estimating the vehicle body inclination angle can be made even more stabilized and simpler.

In the configuration according to claim 11, by considering a characteristic change in a running resistance, accuracy in estimating the vehicle body inclination angular acceleration and the vehicle body inclination angle can be prevented from being degraded as occurring from changing road surface conditions.

In the configuration according to claim 12, the running resistance characteristics are acquired by the estimating means, so that effects from a change in road surface conditions can be compensated for without adding a device for measuring, for example, a road surface shape.

In the configuration according to claim 13, on the assumption that there is no sudden change in road surface conditions, the estimated value of the running resistance parameter is fixed when acquisition of the measured value of the vehicle body inclination angle becomes impossible. This allows effects from changes in the road surface conditions to be reduced to some extent without acquiring the running resistance parameter, acquisition of which is difficult without the measured value of the vehicle body inclination angle.

BEST MODES FOR CARRYING OUT THE INVENTION

Embodiments of the present invention will be described in detail below with reference to the accompanying drawings.

Figure 1:
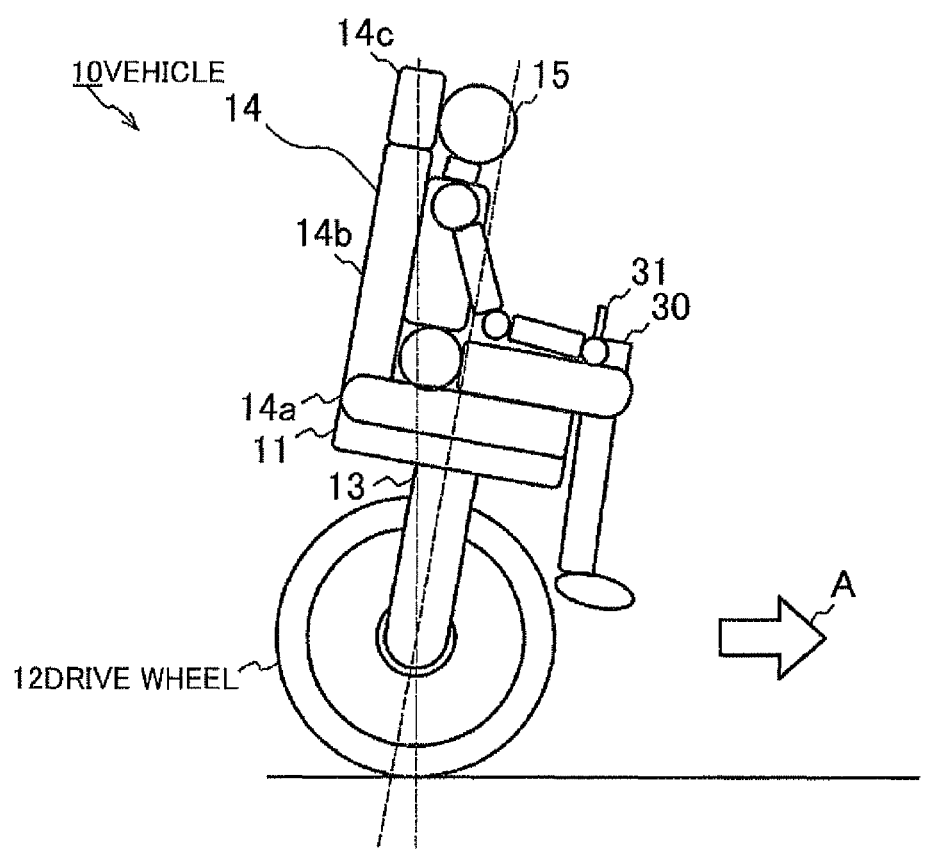
FIG. 1 is an illustration schematically showing a configuration of a vehicle according to a first embodiment of the present invention and showing a condition in which the vehicle is accelerated and moved forward with an occupant riding.
Figure 2:
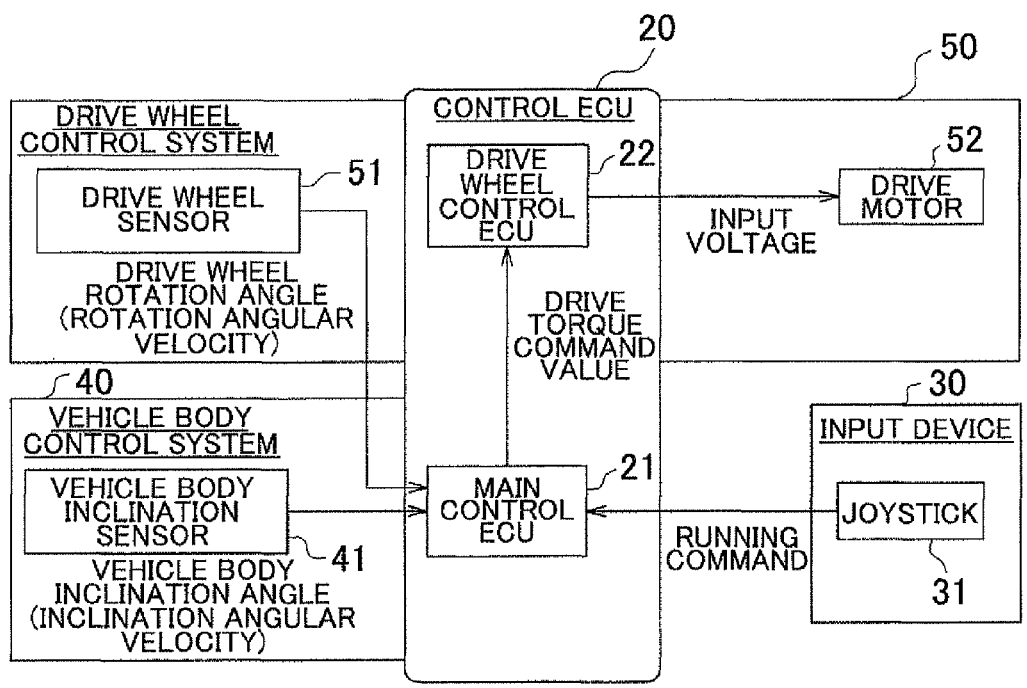
FIG. 2 is a block diagram showing a configuration of a control system of the vehicle according to the first embodiment of the present invention.

FIG. 1 is an illustration schematically showing a configuration of a vehicle according to a first embodiment of the present invention and showing a condition in which the vehicle is accelerated and moved forward with an occupant riding. FIG. 2 is a block diagram showing a configuration of a control system of the vehicle according to the first embodiment of the present invention.

In FIG. 1, reference numeral 10 denotes a vehicle in this embodiment that includes a main unit 11 of a vehicle body, a drive wheel 12, a support section 13, and a riding section 14 on which an occupant 15 rides. Posture of the vehicle body is controlled using posture control of an inverted pendulum. The vehicle 10 is adapted to be capable of inclining the vehicle body in a front-rear direction. The example shown in FIG. 1 shows a condition in which the vehicle 10 is accelerating in a direction shown by an arrow A with the vehicle body inclined forwardly in a moving direction.

The drive wheel 12 is rotatably supported by the support section 13 that forms part of the vehicle body and driven by a drive motor 52 as a driving actuator. The drive wheel 12 has an axis extending in a direction perpendicular to the drawing of FIG. 1 and rotates about the axis. The drive wheel 12 may include a single drive wheel or a plurality of drive wheels. If the drive wheel 12 includes a plurality of drive wheels, the drive wheels are disposed coaxially in parallel with each other. This embodiment will be described on the assumption that there are two drive wheels 12. In this case, each of the drive wheels 12 is driven by a corresponding drive motor 52 independently of each other. A hydraulic motor, an internal combustion engine, or the like may be used for the driving actuator. Herein described is an electric motor used as the driving motor 52.

The main unit 11 that forms part of the vehicle body is supported by the support section 13 from a downward direction and disposed upwardly of the drive wheel 12. The main unit 11 is mounted with the riding section 14 on which the occupant 15 as a driver of the vehicle 10 rides.

For convenience sake, in this embodiment, a case in which the occupant 15 rides on the riding section 14 will be described as an example. However, the occupant 15 does not necessarily ride on the riding section 14. For example, if the vehicle 10 is operated through remote control, the occupant 15 may not ride on the riding section 14, or a cargo may be loaded on the riding section 13 in place of the occupant 15. It is to be noted that the riding section 14 is similar to a seat for use in passenger vehicles, buses, and other automobiles and includes a seat cushion portion 14a, a seat back portion 14b, and a head restraint 14c.

An input device 30 is disposed besides the riding section 14. The input device 30 includes a joystick 31 as a target running condition acquisition device. The occupant 15 operates the joystick 31 to operate the vehicle 10, specifically, to input a running command of acceleration, deceleration, turn, stationary turning, stopping, braking, or other operation of the vehicle 10. It is further noted that, instead of using the joystick 31, any other device such as a jog dial, a touch panel, and a pushbutton may be used as the target running condition acquisition device as long as the device allows the occupant 15 to input a running command through operation.

If the vehicle 10 is operated by remote control, a receiver device that receives a running command from a controller over a wire or wirelessly may be used, instead of the joystick 31, as the target running condition acquisition device. Alternatively, if the vehicle 10 runs automatically according to pre-set running command data, a data reading device that reads the running command data stored in a memory medium, such as a semiconductor memory and a hard disk, may be used as the target running condition acquisition device in place of the joystick 31.

Additionally, the vehicle 10 also includes a control electronic control unit (ECU) 20 as a vehicle controller. The control ECU 20 includes a main control ECU 21 and a drive wheel control ECU 22. The control ECU 20, and the main control ECU 21 and the drive wheel control ECU 22, include arithmetic means such as a CPU and an MPU, storage means such as a magnetic disk and a semiconductor memory, an input/output interface and the like, thereby constituting a computer system for controlling an operation of each part of the vehicle 10. The control ECU 20, the main control ECU 21, and the drive wheel control ECU 22 are disposed in, for example, the main unit 11, or alternatively, may be disposed in the support section 13 or the riding section 14. In addition, the main control ECU 21 and the drive wheel control ECU 22 may be configured separately or integrally.

The main control ECU 21 functions, together with the drive wheel control ECU 22, a drive wheel sensor 51, and the drive motor 52, as part of a drive wheel control system 50 for controlling operations of the drive wheel 12. The drive wheel sensor 51 is formed of a resolver, an encoder, and the like, and functions as a drive wheel rotational condition measuring device. The drive wheel sensor 51 detects a drive wheel rotational angle and/or rotation angular velocity that represents a rotational condition of the drive wheel 12 and transmits the same to the main control ECU 21. In addition, the main control ECU 21 transmits a drive torque command value to the drive wheel control ECU 22 which, in turn, supplies the drive motor 52 with an input voltage corresponding to the drive torque command value received. The drive motor 52 then applies the drive wheel 12 drive torque according to the input voltage, thus functioning as a driving actuator.

The main control ECU 21 functions, together with the drive wheel control ECU 22, a vehicle body inclination sensor 41, and the drive motor 52, as part of a vehicle body control system 40 for controlling the posture of the vehicle body. The vehicle body inclination sensor 41 is formed of an acceleration sensor, a gyro sensor, and the like. Functioning as inclination measuring means, the vehicle body inclination sensor 41 detects a vehicle body inclination angle and/or inclination angular velocity indicating an inclination condition of the vehicle body and transmits the same to the main control ECU 21. The main control ECU 21 then transmits the drive torque command value to the drive wheel control ECU 22.

In addition, the main control ECU 21 receives an input of a running command from the joystick 31 of the input device 30. The main control ECU 21 then transmits the drive torque command value to the drive wheel control ECU 22.

Furthermore, the main control ECU 21 functions as inclination estimating means for estimating the inclination condition of the vehicle body. In addition, the main control ECU 21 also functions as target value determining means for determining a target vehicle body inclination condition, determining means for determining whether it is possible to acquire the measured value of the inclination condition of the vehicle body and to use the measured value for control, inclination angular acceleration estimating means for estimating a vehicle body inclination angular acceleration, resistance parameter acquiring means for estimating a running resistance parameter, and center-of-gravity deviation amount acquiring means for estimating a vehicle body center-of-gravity deviation amount.

It is to be noted that each of the sensors may be a type for acquiring a plurality of state quantities. For example, an acceleration sensor and a gyro sensor may be used in combination as the vehicle body inclination sensor 41 to thereby determine the vehicle body inclination angle and inclination angular velocity from measured values of both.

Operation of the vehicle 10 having the foregoing configuration will be described below. First, an overview of a running and posture control process will be described.

Figure 3:
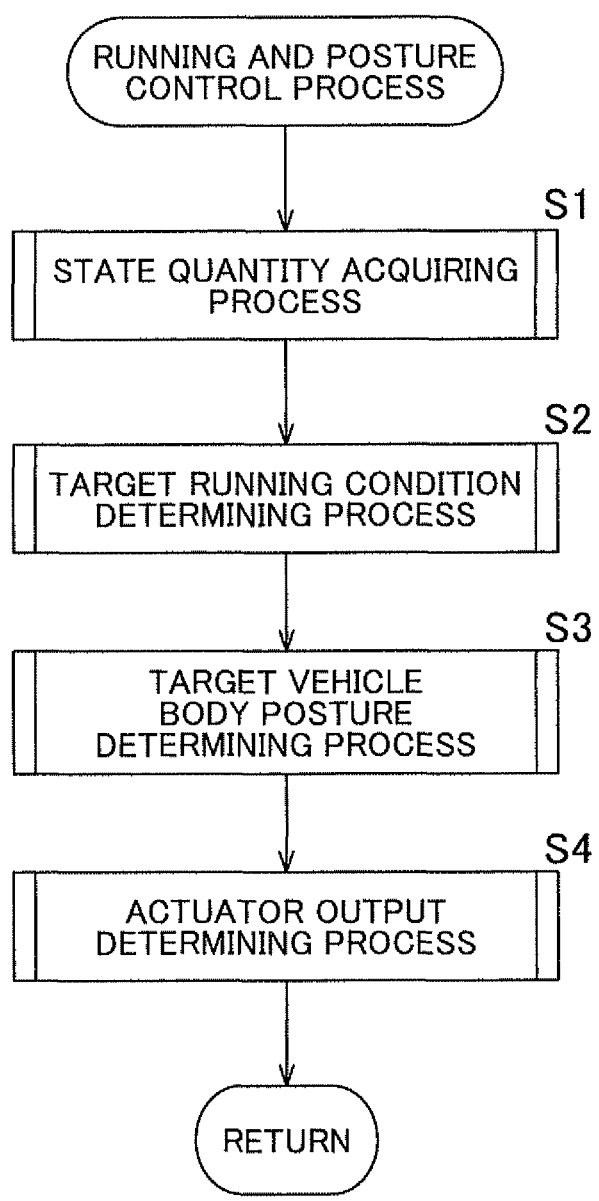
FIG. 3 is a flow chart showing operations of a running and posture control process of the vehicle according to the first embodiment of the present invention.

FIG. 3 is a flow chart showing operations of the running and posture control process of the vehicle according to the first embodiment of the present invention.

In this embodiment, if acquisition of the vehicle body inclination condition using the vehicle body inclination sensor 41 is impossible, the inclination condition of the vehicle body is controlled through estimation thereof based on a rotational condition and the drive torque of the drive wheel 12. Specifically, a vehicle body inclination angle is estimated from a time history of the drive wheel rotation angular acceleration and the drive torque. The estimated value of the vehicle body inclination angle is then replaced by the measured value, and state feedback control is performed. The estimated value of the vehicle body inclination angle is corrected using an estimated value of the vehicle body center-of-gravity deviation amount under a normal condition. Furthermore, the vehicle body inclination angular acceleration is estimated using another dynamic model and corrected using an estimated value of the running resistance parameter under the normal condition. This allows the inverted posture to be maintained even under a condition in which the vehicle body inclination condition cannot be acquired, so that the vehicle 10 of an inverted pendulum type offering greater safety and convenience at a lower cost can be provided.

In the running and posture control process, the control ECU 20 first performs a state quantity acquiring process (step S1) to thereby acquire the rotational condition of the drive wheel 12 and the inclination condition of the vehicle body using each sensor, specifically, the drive wheel sensor 51 and the vehicle body inclination sensor 41, and state quantity estimating means.

Next, the control ECU 20 performs a target running condition determining process (step S2), and determines a target value of acceleration of the vehicle 10 and a target value of the rotation angular velocity of the drive wheel 12 based on an operation amount of the joystick 31.

Next, the control ECU 20 performs a target vehicle body posture determining process (step S3), and determines a target value of the vehicle body inclination angle as a target value of the vehicle body posture based on the target value of acceleration of the vehicle 10 and the target value of the rotation angular velocity of the drive wheel 12 determined through the target running condition determining process.

Finally, the control ECU 20 performs an actuator output determining process (step S4), and determines the output of each actuator, specifically, the output of the drive motor 52, based on each of the state quantities acquired in the state quantity acquiring process, the target running condition determined through the target running condition determining process, and the target vehicle body posture determined through the target vehicle body posture determining process.

The running and posture control process will be described in detail below. First, the state quantity acquiring process will be described.

Figure 4:
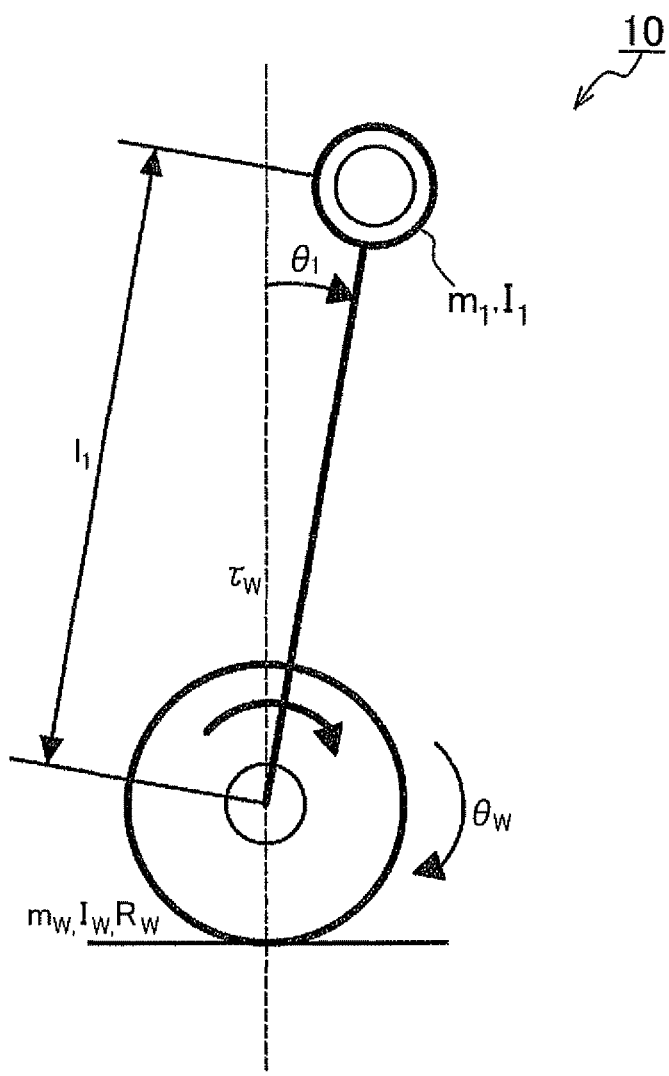
FIG. 4 is an illustration showing a dynamic model and parameters thereof in the vehicle according to the first embodiment of the present invention.
Figure 5:
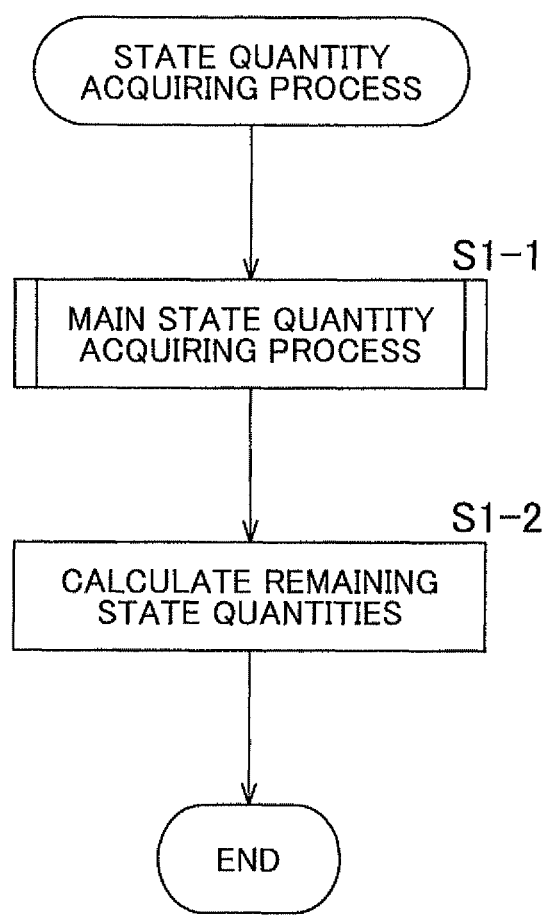
FIG. 5 is a flow chart showing operations of a state quantity acquiring process in the first embodiment of the present invention.

FIG. 4 is an illustration showing a dynamic model of the vehicle and parameters thereof according to the first embodiment of the present invention. FIG. 5 is a flow chart showing operations of the state quantity acquiring process in the first embodiment of the present invention.

In this embodiment, state quantities, inputs, parameters, physical constants, and the like will be represented by the following symbols. It is to be noted that FIG. 4 shows part of the state quantities and the parameters.

$\theta_W$: Drive wheel rotational angle [rad]
$\theta_1$: Vehicle body inclination angle (with reference to a vertical axis) [rad]
$\tau_W$: Drive torque (total of two drive wheels) [Nm]
$m_W$: Drive wheel mass (total of two drive wheels) [kg]
$R_W$: Drive wheel ground contact radius [m]
$I_W$: Drive wheel inertia moment (total of two drive wheels) [kgm$^2$]
$m_1$: Vehicle body mass [kg]
$l_1$: Vehicle body center-of-gravity distance (from axle) [m]
$I_1$: Vehicle body inertia moment (about gravity center) [kgm$^2$]
g: Gravitational acceleration [m/s$^2$]

In the state quantity acquiring process, the main control ECU 21 performs a main state quantity acquiring process for acquiring a drive wheel rotation state quantity and a vehicle body inclination state quantity that serve as main state quantities (step S1-1).

The main control ECU 21 then calculates remaining state quantities (step S1-2). In this case, the remaining state quantities are calculated by differentiating or integrating the acquired state quantities with respect to time. For example, if the state quantities acquired by the main state quantity acquiring process are drive wheel rotational angle $\theta_W$ and vehicle body inclination angle $\theta_1$, the drive wheel rotational angle $\theta_W$ and the vehicle body inclination angle $\theta_1$ are differentiated with respect to time to acquire rotation angular velocity $\dot{\theta}_W$ and inclination angular velocity $\dot{\theta}_1$. Alternatively, if the state quantities acquired are rotation angular velocity $\dot{\theta}_W$ and inclination angular velocity $\dot{\theta}_1$, the rotation angular velocity $\dot{\theta}_W$ and the inclination angular velocity $\dot{\theta}_1$ are integrated with respect to time to acquire the drive wheel rotational angle $\theta_W$ and the vehicle body inclination angle $\theta_1$.

The main state quantity acquiring process will be described below.

Figure 6:
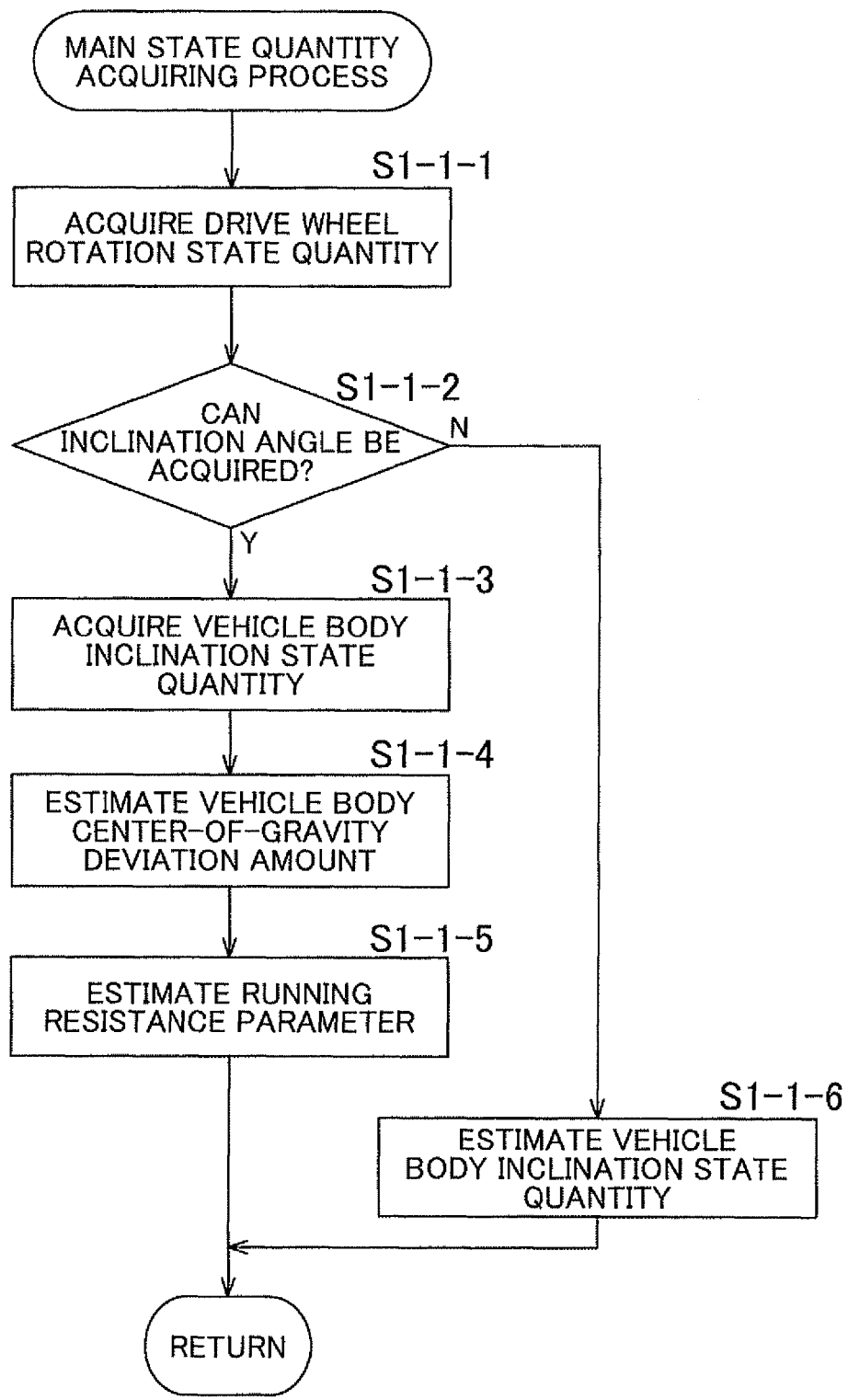
FIG. 6 is a flow chart showing operations of a main state quantity acquiring process in the first embodiment of the present invention.

FIG. 6 is a flow chart showing operations of the main state quantity acquiring process in the first embodiment of the present invention.

In the main state quantity acquiring process, the main control ECU 21 first acquires the drive wheel rotation state quantity (step S1-1-1). In this case, the drive wheel rotational angle $\theta_W$ and/or the rotation angular velocity $\dot{\theta}_W$ are acquired from the drive wheel sensor 51.

Then, the main control ECU 21 determines whether the inclination angle can be acquired (step S1-1-2). Specifically, it is determined whether the vehicle body inclination angle $\theta_1$ as the vehicle body inclination state quantity can be acquired from the vehicle body inclination sensor 41 and, if the vehicle body inclination angle $\theta_1$ can be acquired, it is determined whether the measured value thereof can be used for control. Further, it is determined that the vehicle body inclination angle $\theta_1$ cannot be acquired if, for example, data is yet to be received, a faulty condition notification signal is received, and erroneous data is received.

If the inclination angle can be acquired, the main control ECU 21 acquires the vehicle body inclination state quantity (step S1-1-3). Specifically, the vehicle body inclination angle $\theta_1$ and/or the inclination angular velocity $\dot{\theta}_1$ are acquired from the vehicle body inclination sensor 41.

Then, the main control ECU 21 estimates the vehicle body center-of-gravity deviation amount (step S1-1-4). Specifically, from a time history of each state quantity and the drive torque, vehicle body center-of-gravity deviation amount $\delta_1$ is estimated using Expression (1) as follows.

[Numerical Expression 1]

$$\delta_1 = \delta_1^{(n)}$$
$$\delta_1^{(n)} = \zeta_\delta \tilde{\delta}_1 + (1 - \zeta_\delta)\delta_1^{(n-1)}$$
$$\tilde{\delta}_1 = \theta_{1,M} - \theta_1$$
$$\theta_{1,M} = \frac{1}{m_1 g l_1}(I_1 \ddot{\theta}_1 + m_1 l_1 R_W \ddot{\theta}_W + \tau_W)$$

Expression (1)

where, the second equation in Expression (1) corresponds to a process of low-pass filtering. In the expression, $\zeta_\delta$ is a filter coefficient and $\zeta_\delta = \Delta t/T_\delta$ holds. It is to be noted that $\Delta t$ is a data acquisition interval, specifically, a control process cycle, and $T_\delta$ is a low-pass filter time constant. $\Delta t$ and $T_\delta$ are both predetermined values.

Additionally, $\tilde{\delta}_1$ of the third equation denotes a vehicle body center-of-gravity deviation estimated instantaneous value, and $\theta_{1,M}$ of the fourth equation denotes a model-estimated vehicle body inclination angle.

It is to be noted that, for the value of the drive torque $\tau_W$, a value determined during a preceding control process is used. Furthermore, values of the vehicle body inclination angular acceleration and the drive wheel rotation angular acceleration are acquired by differentiating twice measured values of the vehicle body inclination angle $\theta_1$ and the drive wheel rotational angle $\theta_W$ with respect to time (a difference).

In this embodiment, the vehicle body center-of-gravity deviation amount is estimated as a deviation from a dynamic model relating to vehicle body tilting movement based on the time history of the drive wheel rotational condition, the vehicle body inclination condition, and the drive torque. Specifically, the vehicle body center-of-gravity deviation amount is estimated, with vehicle body rotational inertia, an inertia force involved in acceleration and deceleration of the vehicle 10, gravitational torque, and anti-torque of the drive torque taken into consideration, and on the assumption that effects that are not considered are attributable to the vehicle body center-of-gravity deviation. This allows, for example, mechanical and electrical offsets of the vehicle body inclination sensor 41 to be automatically taken into consideration also as the vehicle body center-of-gravity deviation amount.

Effects from disturbance are removed using the low-pass filter. Effects to be removed include those from temporary motions of the occupant 15, irregularities on road surfaces, noise of sensor signals, and the like. To achieve this in this embodiment, a low-pass filter time constant is set to about 5 sec. for estimating the vehicle body center-of-gravity deviation amount.

In this embodiment, the vehicle body center-of-gravity deviation amount is estimated using a simple linear model. However, the estimation may be made using an even stricter model. For example, a model that takes into account a non-linear effect and an element such as viscous resistance to vehicle body rotation may be used for even stricter estimation. Alternatively, the estimation may also be made using an even simpler model. For example, the estimation may be made using a model that ignores vehicle body rotational inertia with a short characteristic time and the inertia force involved in acceleration and deceleration. Moreover, the accuracy of the estimated value may be maintained by fixing the estimated value, if the vehicle body inclination angular acceleration or the drive wheel rotation angular acceleration is large.

A first-order low-pass filter is used to correct the estimated value in this embodiment. An even higher order filter may instead be used.

Moreover, although the vehicle body center-of-gravity deviation amount is acquired through estimation in this embodiment, another method may also be employed. For example, a plurality of load sensors for measuring a load distribution of the riding section 14 including the occupant 15 riding and other articles loaded on the riding section 14 may be provided, and, based on measurements taken by the sensors, the center-of-gravity deviation amounts of the riding section 14 and the vehicle body may be estimated. This allows further enhancement of accuracy and reliability of the estimation. In this case, other elements that are not considered by the dynamic model, for example, offset of the vehicle body inclination sensor 41, may be estimated using a technique similar to that of this embodiment.

Furthermore, in this embodiment, the deviation from the dynamic model relating to vehicle body tilting movement is estimated as the vehicle body center-of-gravity deviation amount. The deviation may nonetheless be evaluated with other physical quantities. For example, external torque acting on a biased vehicle body is determined to be the deviation and an estimated value thereof is used for estimation of the vehicle body inclination angle (described later). Specifically, the vehicle body center-of-gravity deviation amount is one of the physical quantities corresponding to a deviation from a dynamic model, and the physical quantity used is not limited to the vehicle body center-of-gravity deviation amount.

Then, the main control ECU 21 estimates the running resistance parameter (step S1-1-5). Specifically, from the time history of each state quantity and the drive torque, the running resistance parameter is estimated using Expression (2) as follows.

[Numerical Expression 2]

$$\begin{bmatrix} \tau_{D0} \\ C_D \end{bmatrix} = \begin{bmatrix} N & \Omega_1 \\ \Omega_1 & \Omega_2 \end{bmatrix}^{-1} \begin{bmatrix} T_0 \\ T_1 \end{bmatrix} \quad \text{Expression (2)}$$

$$\Omega_1 = \sum_{k=n-N+1}^{n} \dot{\theta}_W^{(k)}$$

$$T_0 = \sum_{k=n-N+1}^{n} \tilde{\tau}_D^{(k)}$$

$$\Omega_2 = \sum_{k=n-N+1}^{n} \dot{\theta}_W^{(k)^2}$$

$$T_1 = \sum_{k=n-N+1}^{n} \dot{\theta}_W^{(k)} \tilde{\tau}_D^{(k)}$$

$$\tilde{\tau}_D^{(n)} = \tau_W - \tau_{D,M}$$

$$\tilde{\tau}_{D,M} = R_W(\tilde{M} R_W \ddot{\theta}_W + m_1 l_1 \ddot{\theta}_1)$$

where, the first equation in Expression (2) finds a proportionality coefficient $C_D$ and an intercept $\tau_{D0}$ using the least-square method on the assumption that running resistance torque $\tilde{\tau}_D$ is a linear function of a drive wheel rotation angular velocity $\dot{\theta}_W$. In the expression, N is the number of referenced data items.

In Expression (2), $\tilde{\tau}_D^{(n)}$ is a running resistance torque estimated instantaneous value, and $\tilde{\tau}_{D,M}$ is model-estimated running resistance torque.

It is to be noted that $$M = m_1 + m_W \text{ and } \tilde{M} = M + \frac{I_W}{R_W^2}.$$

In this embodiment, the running resistance torque is estimated as a deviation from a dynamic model relating to rotational movement of the drive wheel 12 based on the time history of the drive wheel rotational condition, the vehicle body inclination condition, and the drive torque. Specifically, the running resistance torque is estimated, with effects from the drive torque, inertia relative to acceleration and deceleration of the vehicle 10, and movement of the center of gravity as a result of vehicle body inclination taken into consideration, and on the assumption that effects that are not considered are attributable to the running resistance. This allows effects from road surface gradient and the like to be automatically taken into consideration also as the running resistance torque.

The running resistance parameter is estimated using the least-square method based on a relationship between the running resistance torque and the drive wheel rotation angular velocity. Specifically, assuming a linear relationship between the drive wheel rotation angular velocity and the running resistance torque, a proportionality coefficient and a constant term thereof are estimated as the running resistance parameter. The least-square method functions also as a low-pass filter, and removes effects from temporary motions of the occupant 15, irregularities on road surfaces, and noise of sensor signals. To achieve this in this embodiment, a low-pass filter time constant is set to about 5 sec. for estimating the running resistance parameter.

In this embodiment, the running resistance torque is estimated using a simple linear model; however, the estimation may be made using an even stricter model. For example, a model that takes into account a nonlinear effect may be used for even stricter estimation. Alternatively, the estimation may also be made using an even simpler model. For example, the estimation may be made using a model that ignores vehicle body rotational inertia with a short characteristic time. Moreover, the accuracy of the estimated value may be maintained by fixing the estimated value, if the vehicle body inclination angular acceleration and the drive wheel rotation angular acceleration are large.

In this embodiment, on the assumption that the running resistance torque is represented by a linear function of the drive wheel rotation angular velocity, the parameter thereof is estimated as the running resistance parameter. However, an even higher order nonlinear function may be assumed, instead. Alternatively, it may be assumed that the running resistance torque is a constant that does not depend on the drive wheel rotation angular velocity.

Additionally, in this embodiment, the running resistance torque is acquired through estimation. However, another method may also be employed. For example, the running resistance torque may be estimated by incorporating a road surface shape sensor for measuring road surface conditions around the vehicle and estimating a degree of road surface gradient or running resistance based on the measured values. This allows further enhancement of accuracy and reliability of the estimation. In this case, other elements that are not considered by the dynamic model, for example, rolling resistance on a flat road, may be estimated using a technique similar to that of this embodiment.

Additionally, in this embodiment, the deviation from the dynamic model relating to rotational movement of the drive wheel 12 is estimated as the running resistance torque. The deviation may nonetheless be evaluated with other physical quantities. For example, the road surface gradient may be determined to be the deviation and the estimated value thereof may be used for estimation of the vehicle body inclination angle (described later). Specifically, the running resistance torque is one of the physical quantities corresponding to a deviation from a dynamic model, and the physical quantity used is not limited to the running resistance torque.

If it is determined whether it is possible to acquire the inclination angle, and it is determined that the inclination angle cannot be acquired, on the other hand, the main control ECU 21 estimates the vehicle body inclination state quantity (step 1-1-6). Specifically, from a time history of each state quantity and the drive torque, and each estimated parameter, the vehicle body inclination angle is estimated using Expression (3) as follows.

[Numerical Expression 3]

$$\theta_1 = \theta_1^{(n)}$$
$$\theta_1^{(n)} = \zeta_\theta \tilde{\theta}_1 + (1-\zeta_\theta)\theta_1^{(n-1)}$$
$$\tilde{\theta}_1 = \theta_{1,M} - \delta_1$$
$$\theta_{1,M} = \frac{1}{m_1 g l_1}\left(I_1 \hat{\ddot{\theta}}_1 + m_1 l_1 R_W \dot{\theta}_W + \tau_W\right)$$
$$\hat{\ddot{\theta}} = \frac{1}{m_1 l_1 R_W}\left(\tau_W - \tau_D - \tilde{M} R_W^2 \dot{\theta}_W\right)$$
$$\tau_D = \tau_{D0} + C_D \dot{\theta}_W$$

Expression (3)

where, the second equation in Expression (3) corresponds to a process of low-pass filtering. In the expression, $\zeta_\theta$ is a filter coefficient and $\zeta_\theta = \Delta t/T_\theta$ holds. It is to be noted that $T_\theta$ is a low-pass filter time constant. $\Delta t$ and $T_\theta$ are both predetermined values.

Additionally, $\tilde{\theta}_1$ of the third equation denotes a vehicle body inclination angle estimated instantaneous value, and $\theta_{1,M}$ of the fourth equation denotes a model-estimated vehicle body inclination angle. It is to be noted that $\delta_1$ is a vehicle body deviation amount under the normal condition.

Furthermore, $\hat{\ddot{\theta}}_1$ denotes a vehicle body inclination angular acceleration estimated value, and $\tau_D$ denotes running resistance torque. It is to be noted that $\tau_{D0}$ and $C_D$ are running resistance parameters under the normal condition.

In this embodiment, the vehicle body inclination angle is estimated based on the dynamic model relating to vehicle body tilting movement, using the time history of the drive wheel rotational condition and the drive torque, and a parameter estimated value. At this time, the vehicle body inclination angle is estimated, with gravitational torque, vehicle body rotational inertia, an inertia force involved in acceleration and deceleration of the vehicle, and anti-torque of the drive torque taken into consideration, and from a relationship in magnitude thereof and a proportional relationship between the gravitational torque and the vehicle body inclination angle. In this manner, an unknown vehicle body inclination angle can be estimated by using theoretical relationships between different conditions in the dynamic model and torque.

The estimated value of the vehicle body inclination angle is corrected using the estimated value of the vehicle body center-of-gravity deviation amount under the normal condition (in which the measured value of the vehicle body inclination condition by the vehicle body inclination sensor 41 can be acquired and used). Specifically, on the assumption that the vehicle body center-of-gravity deviation amount corresponding to the deviation from the dynamic model relating to vehicle body tilting movement does not change from that immediately before acquisition of the vehicle body inclination angle measured value becomes impossible, the estimated value of the vehicle body inclination angle is corrected using the estimated value at that particular point in time. With a preparation before the estimation in this manner, effects from the vehicle body center-of-gravity deviation that cannot be taken into consideration in the dynamic model can be considered to some extent. Specifically, by estimating errors in the dynamic model using the measured value that is a true value before the estimation by the dynamic model, the errors can be taken into consideration during actual estimation.

Furthermore, the vehicle body inclination angular acceleration is estimated using another dynamic model. Specifically, the vehicle body inclination angular acceleration is regarded as a state quantity independent of the vehicle body inclination angle and the estimation is made using the dynamic model relating to rotational movement of the drive wheel 12. At this time, effects from the drive torque, inertia relative to acceleration and deceleration of the vehicle, and movement of the center of gravity as a result of vehicle body inclination are taken into consideration. By estimating the vehicle body inclination angular velocity using another model in this manner, accumulation of errors involved in integration of the acceleration and making the estimating calculation unsteady can be avoided, so that a stable and highly accurate estimation of the vehicle body inclination angle is achieved.

In addition, the estimated value of the vehicle body inclination angular acceleration is corrected using the estimated value of the running resistance parameter under the normal condition. Specifically, on the assumption that running resistance characteristics corresponding to the deviation from the dynamic model relating to rotational movement of the drive wheel 12 do not change from those immediately before acquisition of the vehicle body inclination angle measured value becomes impossible, the estimated value of the vehicle body inclination angular acceleration is corrected using the parameter estimated value at that particular point in time. With a preparation before the estimation in this manner, effects from the running resistance that cannot be taken into consideration in the dynamic model can be considered to some extent.

Furthermore, effects from noise and the like are eliminated using a low-pass filter. At this time, to prevent delay in the estimated value from affecting vehicle body posture control (inverted pendulum control), the time constant of the filter is set to be shorter than the characteristic time of the vehicle body inclination.

In this embodiment, the vehicle body inclination angle is estimated using a simple linear model. However, the estimation may be made using an even stricter model. For example, a model that takes into account a nonlinear effect and an element such as viscous resistance to vehicle body rotation may be used for an even stricter estimation. Alternatively, the estimation may also be made using an even simpler model.

The target running condition determining process will be described below.

Figure 7:
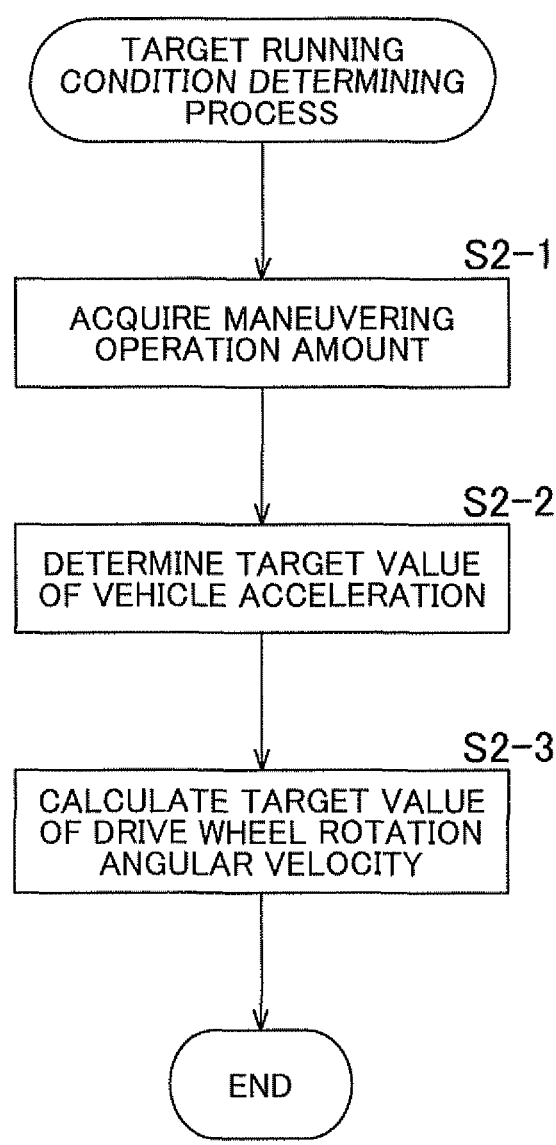
FIG. 7 is a flow chart showing operations of a target running condition determining process in the first embodiment of the present invention.

FIG. 7 is a flow chart showing operations of the target running condition determining process in the first embodiment of the present invention.

In the target running condition determining process, the main control ECU 21 first acquires a maneuvering operation amount (step S2-1). Acquired in this case are an operation amount of the joystick 31 operated by the occupant 15 in order to input a running command of acceleration, deceleration, turning, stationary turning, stopping, braking, or other operation of the vehicle 10.

The main control ECU 21 then determines a target value of vehicle acceleration based on the operation amount of the joystick 31 acquired (step S2-2). For example, a value proportional to the operation amount of the joystick 31 in a front-rear direction is determined to be the vehicle acceleration target value.

The main control ECU 21 then calculates a target value of the drive wheel rotation angular velocity from the vehicle acceleration target value determined (step S2-3). For example, a value acquired by integrating the vehicle acceleration target value with respect to time and dividing the integrated value by the drive wheel ground contact radius $R_W$ is determined to be the target value of the drive wheel rotation angular velocity.

The target vehicle body posture determining process will be described below.

Figure 8:
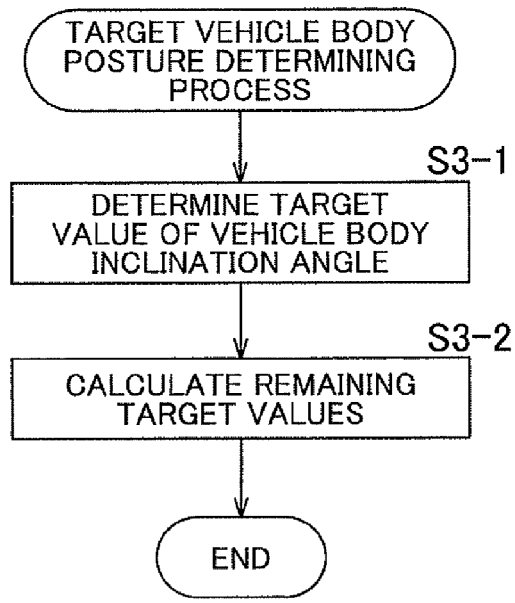
FIG. 8 is a flow chart showing operations of a target vehicle body posture determining process in the first embodiment of the present invention.

FIG. 8 is a flow chart showing operations of the target vehicle body posture determining process in the first embodiment of the present invention.

In the target vehicle body posture determining process, the main control ECU 21 first determines a target value of the vehicle body inclination angle (step S3-1).

In this case, the target value of the vehicle body inclination angle is determined using Expression (4) as follows from the target value of the vehicle acceleration determined through the target running condition determining process.

[Numerical Expression 4]

$$\theta_1^* = \frac{m_1 l_1 + \tilde{M} R_W}{m_1 l_1} \alpha^*$$

Expression (4)

In this expression, $\alpha^*$ is the target value of the vehicle acceleration. In this manner, the target value of the vehicle body inclination angle is determined in consideration of the inertia force and the anti-torque of the drive torque acting on the vehicle body in association with the vehicle acceleration.

The main control ECU 21 then calculates remaining target values (step S3-2). Specifically, target values of the drive wheel rotational angle and the vehicle body inclination angular velocity are calculated by differentiating or integrating each target value with respect to time.

The actuator output determining process will be described below.

Figure 9:
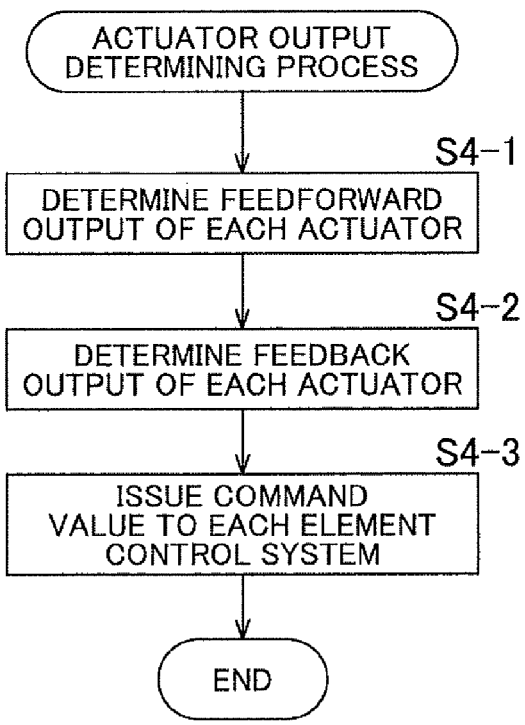
FIG. 9 is a flow chart showing operations of an actuator output determining process in the first embodiment of the present invention.

FIG. 9 is a flow chart showing operations of the actuator output determining process in the first embodiment of the present invention.

In the actuator output determining process, the main control ECU 21 first determines a feedforward output of each actuator (step S4-1). In this case, the feedforward output of the drive motor 52 is determined using Expression (5) as follows from each target value.

[Numerical Expression 5]

$$\tau_{W,FF} = \tilde{M} R_W g \alpha^*$$

Expression (5)

In this manner, the running and posture control of the vehicle 10 is accurately performed by adding drive torque required for achieving the target vehicle acceleration.

Then, the main control ECU 21 determines a feedback output of each actuator (step S4-2). In this case, the feedback output of the drive motor 52 is determined using Expression (6) as follows from a difference between each target value and an actual state quantity or estimated value.

[Numerical Expression 6]

$$\tau_{W,FB} = K_{W1}(\theta_W - \theta_W^*) - K_{W2}(\dot{\theta}_W - \dot{\theta}_W^*) - K_{W3}(\theta_1 - \theta_1^*) - K_{W4}(\dot{\theta}_1 - \dot{\theta}_1^*)$$

Expression (6)

Here, for example, an optimum regulator value is set in advance to the value of each of the feedback gains $K_{W1}$ to $K_{W4}$.

It is to be noted that a nonlinear feedback control, such as a sliding mode control, may be employed. As an even simpler control, some of the gains excluding $K_{W2}$ and $K_{W3}$ may be set to be zero. Furthermore, an integral gain may be introduced to eliminate steady-state deviation.

In this embodiment, whether the control is performed based on the measured value of the vehicle body inclination angle by the vehicle body inclination sensor 41 or the estimated value of the vehicle body inclination angle by the inclination estimating means, specifically, regardless of whether the vehicle body inclination angle measured value can be acquired or not, the running and the posture control is performed according to a control law identical to that shown in Expression (6). This simplifies the control law, so that labor spent in designing a control system and in programming and calculation cost incurred during control operations can be significantly reduced.

Finally, the main control ECU 21 issues a command value to each element control system (step S4-3). In this case, the main control ECU 21 transmits, as a drive torque command value, a sum of the feedforward output and the feedback output determined as described above to the drive wheel control ECU 22.

As described above, in this embodiment, if acquisition of the vehicle body inclination condition using the vehicle body inclination sensor 41 is impossible, the vehicle body inclination angle is estimated from the time history of the drive wheel rotation angular acceleration and drive torque. The estimated value of the vehicle body inclination angle is then replaced by the measured value, and state feedback control is performed. The estimated value of the vehicle body inclination angle is corrected using the vehicle body center-of-gravity deviation estimated value under the normal condition. Furthermore, the vehicle body inclination angular acceleration is estimated using another dynamic model and corrected using the estimated value of the running resistance parameter under the normal condition. This allows the inverted posture to be maintained even under a condition in which the vehicle body inclination condition cannot be acquired, so that the vehicle 10 of an inverted pendulum type offering greater safety and convenience at a lower cost can be provided.

A second embodiment of the present invention will be described below. Parts of the same configurations as those in the first embodiment are denoted by the same reference numerals, and descriptions thereof will be omitted. Descriptions of the same operations and the same effects as in the first embodiment will also be omitted.

Figure 10:
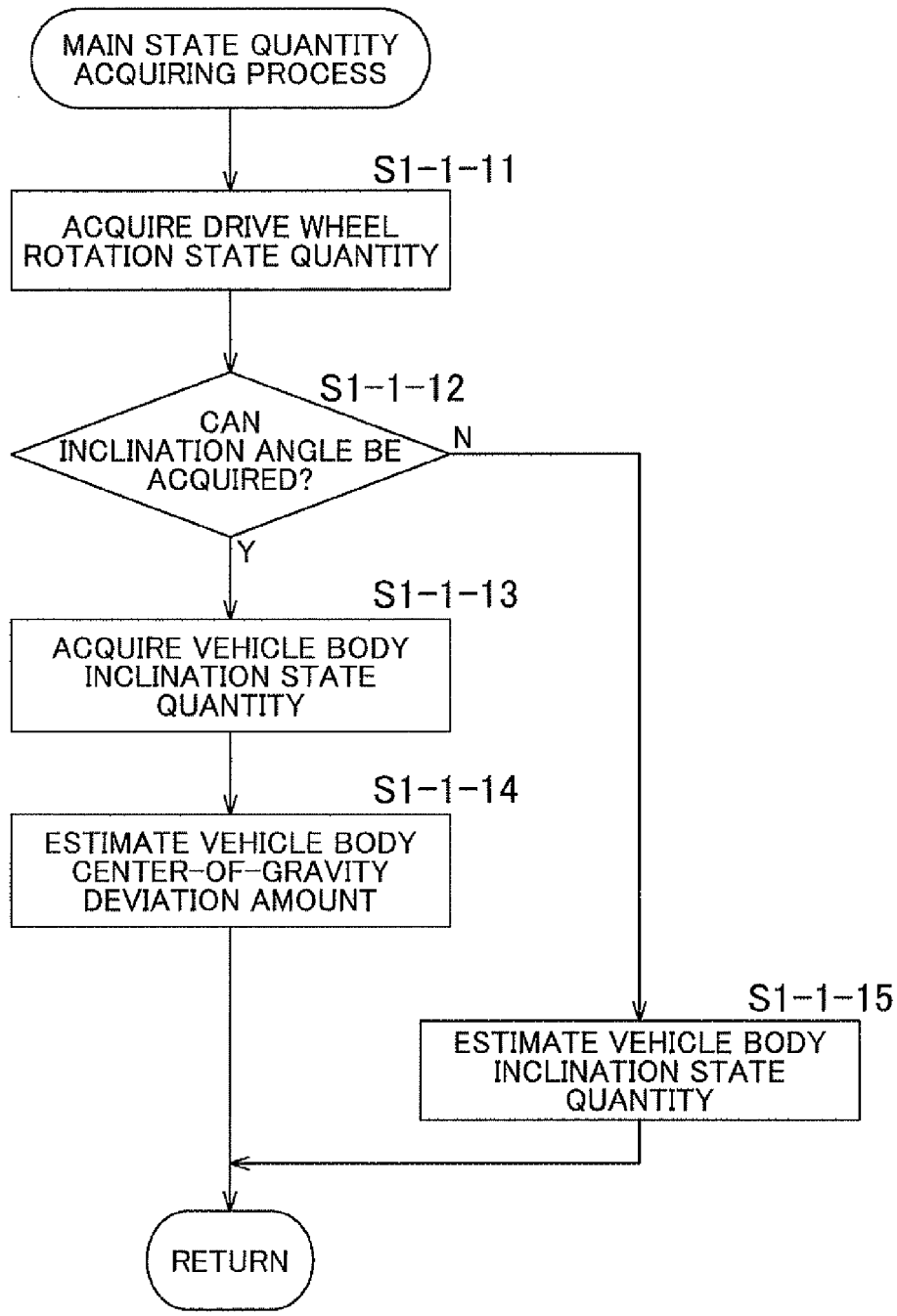
FIG. 10 is a flow chart showing operations of a main state quantity acquiring process in a second embodiment of the present invention.

FIG. 10 is a flow chart showing operations of the main state quantity acquiring process in the second embodiment of the present invention.

In this embodiment, when the vehicle body inclination angle is estimated, the vehicle body inclination angle estimated value is corrected using only the dynamic model relating to vehicle body tilting movement and the estimated value of the vehicle body center-of-gravity deviation amount, without using the dynamic model relating to rotational movement of the drive wheel 12 and the estimated value of the running resistance torque.

If road surface conditions (e.g., road surface gradient) change after the acquisition of the measured value of the vehicle body inclination condition becomes impossible, accuracy in estimating and controlling the vehicle body inclination angle may be degraded. For example, in the case in which the running resistance parameter estimated value immediately before acquisition of the measured value of the vehicle body inclination condition becomes impossible is used, if the running resistance parameter changes with a change in the road surface condition thereafter (entry in and exit from an uphill road and a rough road), an error is caused in estimation of the vehicle body inclination angle using the running resistance parameter. Therefore, it is desirable to assure great safety and convenience even under a running environment in which the road surface condition suddenly changes.

Thus, in this embodiment, the vehicle body inclination angle estimated value is corrected using only the vehicle body center-of-gravity deviation estimated value. Specifically, the vehicle body inclination angle is estimated based on a relationship between the angle and angular acceleration of vehicle body inclination. This eliminates the need for estimation of the vehicle body inclination angular acceleration using the running resistance parameter.

This prevents control accuracy from being degraded when the road surface condition changes after the acquisition of the measured value of the vehicle body inclination condition becomes impossible. The vehicle 10 of an inverted pendulum type offering safety and convenience even under a running environment with a sudden change in the road surface condition can therefore be provided.

The main state quantity acquiring process in this embodiment will be described below. It is to be noted that the running and posture process, the state quantity acquiring process, the target running condition determining process, the target vehicle body posture determining process, and the actuator output determining process are the same as those in the first embodiment and descriptions thereof will be omitted.

In the main state quantity acquiring process, the main control ECU 21 first acquires the drive wheel rotation state quantity (step S1-1-11). In this case, the drive wheel rotational angle $\theta_W$ and/or the rotation angular velocity $\dot{\theta}_W$ are acquired from the drive wheel sensor 51.

Then, the main control ECU 21 determines whether the inclination angle can be acquired (step S1-1-12). Specifically, it is determined whether the vehicle body inclination angle $\theta_1$ as the vehicle body inclination state quantity can be acquired from the vehicle body inclination sensor 41 and, if the vehicle body inclination angle $\theta_1$ can be acquired, it is determined whether the measured value thereof can be used for control. It is determined that the vehicle body inclination angle $\theta_1$ cannot be acquired if, for example, data is yet to be received, a faulty condition notification signal is received, and erroneous data is received.

If the inclination angle can be acquired, the main control ECU 21 acquires the vehicle body inclination state quantity (step S1-1-13). Specifically, the vehicle body inclination angle $\theta_1$ and/or the inclination angular velocity $\dot{\theta}_1$ are acquired from the vehicle body inclination sensor 41.

Then, the main control ECU 21 estimates the vehicle body center-of-gravity deviation amount (step S1-1-14). Specifically, from a time history of each state quantity and the drive torque, vehicle body center-of-gravity deviation amount $\delta_1$ is estimated using Expression (1) described earlier in the first embodiment.

If it is determined that the inclination angle cannot be acquired, on the other hand, the main control ECU 21 estimates the vehicle body inclination state quantity (step 1-1-15). Specifically, from a time history of each state quantity and the drive torque, and each estimated parameter, the vehicle body inclination angle is estimated using Expression (7) as follows.

[Numerical Expression 7]

$$\theta_1 = \theta_1^{(n)}$$

$$\theta_1^{(n)} = \zeta_\theta \tilde{\theta}_1 + (1-\zeta_\theta)\theta_1^{(n-1)}$$

$$\tilde{\theta}_1 = \theta_{1,M} - \delta_1$$

$$\theta_{1,M} = \frac{1}{m_1 g l_1}(I_1 \hat{\ddot{\theta}}_1 + m_1 l_1 R_W \dot{\theta}_W + \tau_W)$$

$$\hat{\ddot{\theta}}_1 = \frac{\theta_1^{(n-1)} - 2\theta_1^{(n-2)} + \theta_1^{(n-3)}}{(\Delta t)^2}$$

Expression (7)

The upper four equations of Expression (7) are the same as those in Expression (3). Constants and the like in the expression are also the same as those previously described in Expression (3).

In this embodiment, the vehicle body inclination angle is estimated based on the dynamic model relating to vehicle body tilting movement, using the time history of the drive wheel rotational condition and the drive torque, and the parameter estimated value. At this time, the vehicle body inclination angle is estimated, with gravitational torque, vehicle body rotational inertia, an inertia force involved in acceleration and deceleration of the vehicle, and anti-torque of the drive torque taken into consideration, and from a relationship in magnitude thereof and a proportional relationship between the gravitational torque and the vehicle body inclination angle. In this manner, an unknown vehicle body inclination angle can be estimated by using theoretical relationships between different conditions in the dynamic model and torque.

The estimated value of the vehicle body inclination angle is corrected using the estimated value of the vehicle body center-of-gravity deviation amount under the normal condition (in which the measured value of the vehicle body inclination condition by the vehicle body inclination sensor 41 can be acquired and used). Specifically, on the assumption that the vehicle body center-of-gravity deviation amount corresponding to the deviation from the dynamic model relating to vehicle body tilting movement does not change from that immediately before acquisition of the vehicle body inclination angle measured value becomes impossible, the estimated value of the vehicle body inclination angle is corrected using the estimated value at that particular point in time. With a preparation before the estimation in this manner, effects from the vehicle body center-of-gravity deviation that cannot be taken into consideration in the dynamic model can be considered to some extent. Specifically, by estimating errors in the dynamic model using the measured value that is a true value before the estimation by the dynamic model, the errors can be taken into consideration during actual estimation.

Additionally, the vehicle body inclination angle is estimated based on the relationship between the angle and angular acceleration of vehicle body inclination. At this time, the vehicle body inclination angular acceleration is given as a second-order time derivative (difference) of the vehicle body inclination angle. Specifically, based on the time history of the vehicle body inclination angle estimated values up to that particular point in time, the vehicle body inclination angle at that particular point in time is estimated. In other words, the estimated value of the vehicle body inclination angle is found by solving a second-order differential equation of the vehicle body inclination angle including acceleration through numerical integration. It is to be noted that the vehicle body inclination angle measured value acquired last is used as an initial value. As such, a dynamic model relating to the running resistance parameter, specifically, the dynamic model relating to rotation of the drive wheel 12 is not used, so that the estimated value of the vehicle body inclination angle is not affected by errors in estimation of the running resistance. The vehicle body inclination angle can thus be estimated with equivalent accuracy, even if the road surface condition (entry in and exit from an uphill road and a rough road) changes after the acquisition of the vehicle body inclination condition measured value becomes impossible.

Furthermore, effects from noise and the like are eliminated using a low-pass filter. At this time, to prevent delay in the estimated value from affecting vehicle body posture control (inverted pendulum control), the time constant of the filter is set to be shorter than the characteristic time of the vehicle body inclination.

In this embodiment, the vehicle body inclination angle is estimated using a simple linear model. However, the estimation may be made using an even stricter model. For example, a model that takes into account a nonlinear effect and an element such as viscous resistance to vehicle body rotation may be used for even stricter estimation. Alternatively, the estimation may also be made using an even simpler model.

In addition, in this embodiment, the vehicle body inclination angular acceleration is evaluated by a backward difference using past data only. However, a difference equation including current data may be used. Another calculation method may also be used for numerical time integration. For example, a fourth-order Runge-Kutta method may be used to estimate the vehicle body inclination angle even more accurately.

As described above, in this embodiment, the vehicle body inclination angle estimated value is corrected using only the vehicle body center-of-gravity deviation estimated value. This eliminates the need for estimating the vehicle body inclination angular acceleration using the running resistance parameter, which allows running in inverted posture to be maintained even with a change in the road surface condition after the acquisition of the measured value of the vehicle body inclination condition becomes impossible. The vehicle 10 of an inverted pendulum type offering safety and convenience even under a running environment with a sudden change in the road surface condition can therefore be provided.

The vehicle body inclination angular acceleration is determined, in the first embodiment, through the estimation made using the drive wheel rotational movement model including the running resistance to thereby avoid accumulation of errors involved in integration of the acceleration, and in the second embodiment, through the evaluation in terms of the time history of the vehicle body inclination angle to thereby avoid effects from changes in road surface resistance. Either method of these two may be selectively employed according to, for example, the running condition.

For example, the method of the first embodiment may be used for use under an environment with only small changes in the road surface, such as indoor environment, and the method of the second embodiment may be used for use under an environment with large changes in the road surface, such as outdoor environment. Alternatively, the method of the first embodiment may be used, if running needs to be maintained for relatively long hours after the acquisition of the vehicle body inclination angle becomes impossible and the method of the second embodiment may be used, if the vehicle can be brought to a stop within a short time. Furthermore, either method may be selected according to an operation of a selector device by the occupant 15.

Making advantages of both methods compatible with each other by taking such an approach as described above allows safety and comfort to be further enhanced.

In each of the foregoing embodiments, the vehicle body inclination sensor 41 for measuring the vehicle body inclination condition is provided, and acquisition of the vehicle body inclination condition using the inclination estimating means is performed only when acquisition of the measured value thereof becomes impossible. However, the inclination condition of the vehicle body may be acquired using inclination estimating means at all times, without providing the vehicle body inclination sensor 41. In addition, the vehicle body inclination sensor 41 may be used for verifying the estimated value.

Third and fourth embodiments of the present invention will next be described.

In the related art vehicle described in "BACKGROUND ART", running of the vehicle and posture of the vehicle body are controlled using the measured value of the rotational condition of the drive wheel acquired by a sensor. If the measured value cannot be acquired or an abnormal measured value is acquired due to a sensor failure or a communication error, not only the vehicle running condition can no longer be controlled, but also control of inverted posture of the vehicle body can no longer continue. The control is therefore forced to be immediately interrupted to thereby tilt and ground the vehicle body.

In preparation for such a situation, it is conceivable that a plurality of sensors and communication means are prepared in advance. However, providing a plurality of sensors and communication means makes a system costly and complicated. Specifically, it is difficult for a low-priced, simple system to assure sufficient safety and convenience.

It is an object of the third and fourth embodiments of the present invention to solve the above-described problems of the related art vehicles and to provide a safer, more convenient, and lower-priced vehicle that is capable of maintaining running in inverted posture even under a condition in which the rotational condition of the drive wheel cannot be acquired, by estimating the rotational condition of the drive wheel from the inclination condition of the vehicle body and the drive torque if the measured value by a sensor cannot be acquired.

The third embodiment will be described below first. Parts of the same configurations as those in the first and the second embodiments are denoted by the same reference numerals, and descriptions of those parts will be omitted. Descriptions of the same operations and the same effects as in the first and second embodiments will also be omitted.

A main control ECU 21 of this embodiment functions as rotation estimating means for estimating a rotational condition of the drive wheel 12. In addition, the main control ECU 21 also functions as target value determining means for determining a target rotational condition of the drive wheel 12, determining means for determining whether it is possible to acquire the measured value of the rotational condition of the drive wheel 12 and to use the measured value for control, rotation angular acceleration estimating means for estimating the rotation angular acceleration of the drive wheel 12, resistance torque acquiring means for estimating the running resistance torque of the drive wheel 12, resistance parameter acquiring means for estimating the running resistance parameter, and center-of-gravity deviation amount acquiring means for estimating the vehicle body center-of-gravity deviation amount.

Configurations in other respects are the same as those of the first embodiment, and descriptions thereof will be omitted.

Operation of the vehicle 10 having the foregoing configuration will be described below. First, an overview of a running and posture control process will be schematically described.

In this embodiment, if acquisition of the drive wheel rotational condition using a drive wheel sensor 51 is impossible, the rotational condition of the drive wheel 12 is controlled through estimation thereof based on the inclination condition of the vehicle body and the drive torque. Specifically, the drive wheel rotation angular velocity is estimated from the time history of the vehicle body inclination angular acceleration and the drive torque. The estimated value of the drive wheel rotation angular velocity is then replaced by the measured value, and state feedback control is performed. The estimated value of the drive wheel rotation angular velocity is corrected using the estimated value of the running resistance parameter under a normal condition. Furthermore, the drive wheel rotation angular acceleration is estimated using another dynamic model and corrected using the estimated value of the vehicle body center-of-gravity deviation amount under the normal condition. This allows the running condition and inverted posture to be maintained even under a condition in which the vehicle body inclination condition cannot be acquired, so that the vehicle 10 of an inverted pendulum type offering greater safety and convenience at a lower cost can be provided.

Operations of the running and posture control process are the same as those of the first embodiment, and descriptions thereof will be omitted.

The state quantity acquiring process is the same as that of the first embodiment, and descriptions thereof will be omitted.

The main state quantity acquiring process will be described below.

Figure 11:
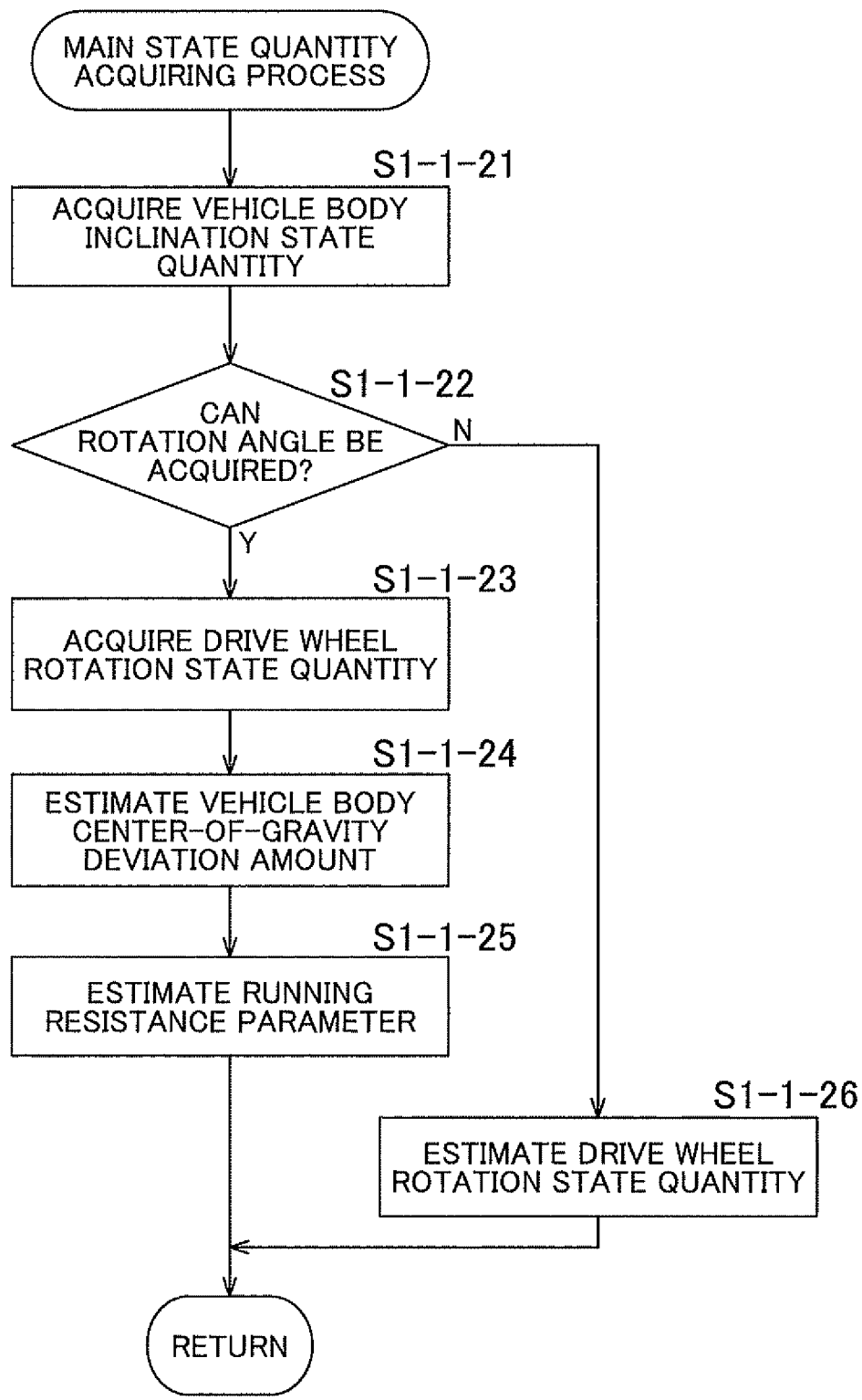
FIG. 11 is a flow chart showing operations of a main state quantity acquiring process in a third embodiment of the present invention.

FIG. 11 is a flow chart showing operations of the main state quantity acquiring process in the third embodiment of the present invention.

To simplify descriptions in this embodiment, only for a state quantity acquired by measuring means in the main state quantity acquiring process, a state quantity acquired by differentiation or integration of the state quantity acquired with respect to time, specifically, a calculated value, will also be described as the "measured value".

In the main state quantity acquiring process, the main control ECU 21 first acquires the vehicle body inclination state quantity (step S1-1-21). In this case, the vehicle body inclination angle $\theta_1$ and/or the inclination angular velocity $\dot{\theta}_1$ are acquired from the vehicle body inclination sensor 41.

Then, the main control ECU 21 determines whether the rotational angle can be acquired (step S1-1-22). Specifically, it is determined whether the drive wheel rotational angle $\theta_W$ as the drive wheel rotation state quantity can be acquired from the drive wheel sensor 51, and if the drive wheel rotational angle $\theta_W$ can be acquired, it is determined whether the measured value thereof can be used for control. It is determined that the drive wheel rotational angle $\theta_W$ cannot be acquired if, for example, data is yet to be received, a faulty condition notification signal is received, and erroneous data is received.

If the rotational angle can be acquired, the main control ECU 21 acquires the drive wheel rotation state quantity (step S1-1-23). Specifically, the drive wheel rotational angle $\theta_W$ and/or the rotation angular velocity $\dot{\theta}_W$ are acquired from the drive wheel sensor 51.

Operations performed by the main control ECU 21 to estimate the vehicle body center-of-gravity deviation amount and the running resistance parameter, specifically, operations in steps S1-1-24 and S1-1-25 are the same as those in steps S1-1-4 and S1-1-5 of the first embodiment, and descriptions thereof will be omitted.

If it is determined that the rotational angle cannot be acquired, on the other hand, the main control ECU 21 estimates the drive wheel rotation state quantity (step 1-1-26). Specifically, from a time history of each state, quantity and the drive torque, and each estimated parameter, the drive wheel rotation state quantity is estimated using Expression (8) as follows.

[Numerical Expression 8]

$$\dot{\theta}_W = \dot{\theta}_W^{(n)} \qquad \text{Expression (8)}$$
$$\dot{\theta}_W^{(n)} = \zeta_W \dot{\tilde{\theta}}_W + (1 - \zeta_W)\dot{\theta}_W^{(n-1)}$$
$$\dot{\tilde{\theta}}_W = \frac{\tilde{\tau}_D - \tau_{D0}}{C_D}$$
$$\tilde{\tau}_D = \tau_W - \tau_{D,M}$$
$$\tau_{D,M} = R_W(\hat{M}R_W\ddot{\hat{\theta}}_W + m_1 l_1 \ddot{\theta}_1)$$
$$\ddot{\hat{\theta}}_W = \frac{1}{m_1 l_1 R_W}\{-\tau_W - I_1 \ddot{\theta}_1 + m_1 g l_1 (\theta_1 + \delta_1)\}$$

where, the second equation in Expression (8) corresponds to a process of low-pass filtering. In the expression, $\zeta_W$ is a filter coefficient and $\zeta_W = \Delta t/T_W$ holds. It is to be noted that $T_W$ is a low-pass filter time constant. $\Delta t$ and $T_W$ are both predetermined values.

Additionally, $\dot{\tilde{\theta}}_W$ of the third equation denotes a drive wheel rotation angular velocity estimated instantaneous value, and $\tau_{D0}$ and $C_D$ are running resistance parameters under the normal condition. Furthermore, $\tilde{\tau}_D$ in the fourth equation denotes a running resistance torque estimated instantaneous value, and $\tau_{D,M}$ of the fifth equation denotes a model-estimated running resistance torque.

Furthermore, $\ddot{\hat{\theta}}_W$ denotes a drive wheel rotation angular acceleration estimated value, and $\delta_1$ denotes the vehicle body center-of-gravity deviation amount under the normal condition.

In this embodiment, the drive wheel rotation angular velocity is estimated based on the dynamic model relating to rotational movement of the drive wheel 12, using the time history of the vehicle body inclination condition and the drive torque, and the parameter estimated value. At this time, the running resistance torque is estimated, with the drive torque, inertia relative to acceleration and deceleration of the vehicle, effects from movement of the center of gravity as a result of vehicle body inclination, and the running resistance torque taken into consideration, and from a relationship in magnitude thereof. The drive wheel rotation angular velocity is then estimated on the assumption that a linear relationship holds between the running resistance torque and the drive wheel rotation angular velocity. In this manner, an unknown drive wheel rotation angular velocity can be estimated by using theoretical relationships between different conditions in the dynamic model and torque.

The estimated value of the drive wheel rotation angular velocity is determined using the estimated value of the running resistance parameter under the normal condition (in which the measured value of the drive wheel rotational condition by the drive wheel sensor 51 can be acquired and used). Specifically, on the assumption that characteristics of the running resistance torque corresponding to the deviation from the dynamic model relating to rotational movement of the drive wheel 12 do not change from that immediately before acquisition of the drive wheel rotation angular velocity measured value becomes impossible, the estimated value of the drive wheel rotation angular velocity is determined using the estimated value at that particular point in time. With a preparation before the estimation in this manner, a characteristic change in the running resistance that cannot be taken into consideration in the dynamic model can be considered to some extent. Specifically, by estimating errors in the dynamic model using the measured value that is a true value before the estimation by the dynamic model, the errors can be taken into consideration during actual estimation.

Furthermore, the drive wheel rotation angular acceleration is estimated using another dynamic model. Specifically, the drive wheel rotation angular acceleration is regarded as a state quantity independent of the drive wheel rotation angular velocity, and is estimated using the dynamic model relating to vehicle body tilting movement. At this time, gravitational torque, vehicle body rotational inertia, an inertia force involved in acceleration and deceleration of the vehicle, and anti-torque of the drive torque are taken into consideration. By estimating the drive wheel rotation angular acceleration using another model in this manner, accumulation of errors involved in integration of the acceleration and making the estimating calculation unsteady can be avoided, so that a stable and highly accurate estimation of the drive wheel rotation angular velocity is achieved.

In addition, the estimated value of the drive wheel rotation angular acceleration is corrected using the estimated value of the vehicle body center-of-gravity deviation amount under the normal condition. Specifically, on the assumption that the vehicle body center-of-gravity deviation amount corresponding to the deviation from the dynamic model relating to vehicle body tilting movement does not change from that immediately before acquisition of the drive wheel rotation angular velocity measured value becomes impossible, the estimated value of the drive wheel rotation angular acceleration is corrected using the vehicle body center-of-gravity deviation amount estimated value at that particular point in time. With a preparation before the estimation in this manner, effects from the vehicle body center-of-gravity deviation that cannot be taken into consideration in the dynamic model can be considered to some extent.

Furthermore, effects from noise and the like are eliminated using a low-pass filter. At this time, to prevent delay in the estimated value from affecting vehicle body posture control (inverted pendulum control), the time constant of the filter is set to be shorter than the characteristic time of the vehicle body inclination.

In this embodiment, the drive wheel rotation angular velocity is estimated using a simple linear model. However, the estimation may be made using an even stricter model. For example, a model that takes into account a nonlinear effect and an element such as viscous resistance to vehicle body rotation may be used for even stricter estimation. Alternatively, the estimation may also be made using an even simpler model.

The target running condition determining process, the target vehicle body posture determining process, and the actuator output determining process, which are subsequent processes, are the same as those of the first embodiment, and descriptions thereof will be omitted.

As described above, in this embodiment, if acquisition of the drive wheel rotational condition using the drive wheel sensor 51 is impossible, the drive wheel rotation angular velocity is estimated from the time history of the vehicle body inclination angular acceleration and the drive torque. The estimated value of the drive wheel rotation angular velocity is then replaced by the measured value, and state feedback control is performed. The drive wheel rotation angular velocity is also estimated using the running resistance parameter estimated value under the normal condition. Furthermore, the drive wheel rotation angular acceleration is estimated using another dynamic model and corrected using the estimated value of the vehicle body center-of-gravity deviation amount under the normal condition. This allows the running condition and the inverted posture to be maintained even under a condition in which the rotational condition of the drive wheel 12 cannot be acquired, so that the vehicle 10 of an inverted pendulum type offering greater safety and convenience at a lower cost can be provided.

The fourth embodiment of the present invention will next be described. Parts of the same configurations as those in the third embodiment are denoted by the same reference numerals, and descriptions thereof will be omitted. Descriptions of the same operations and the same effects as in the third embodiment will also be omitted.

Figure 12:
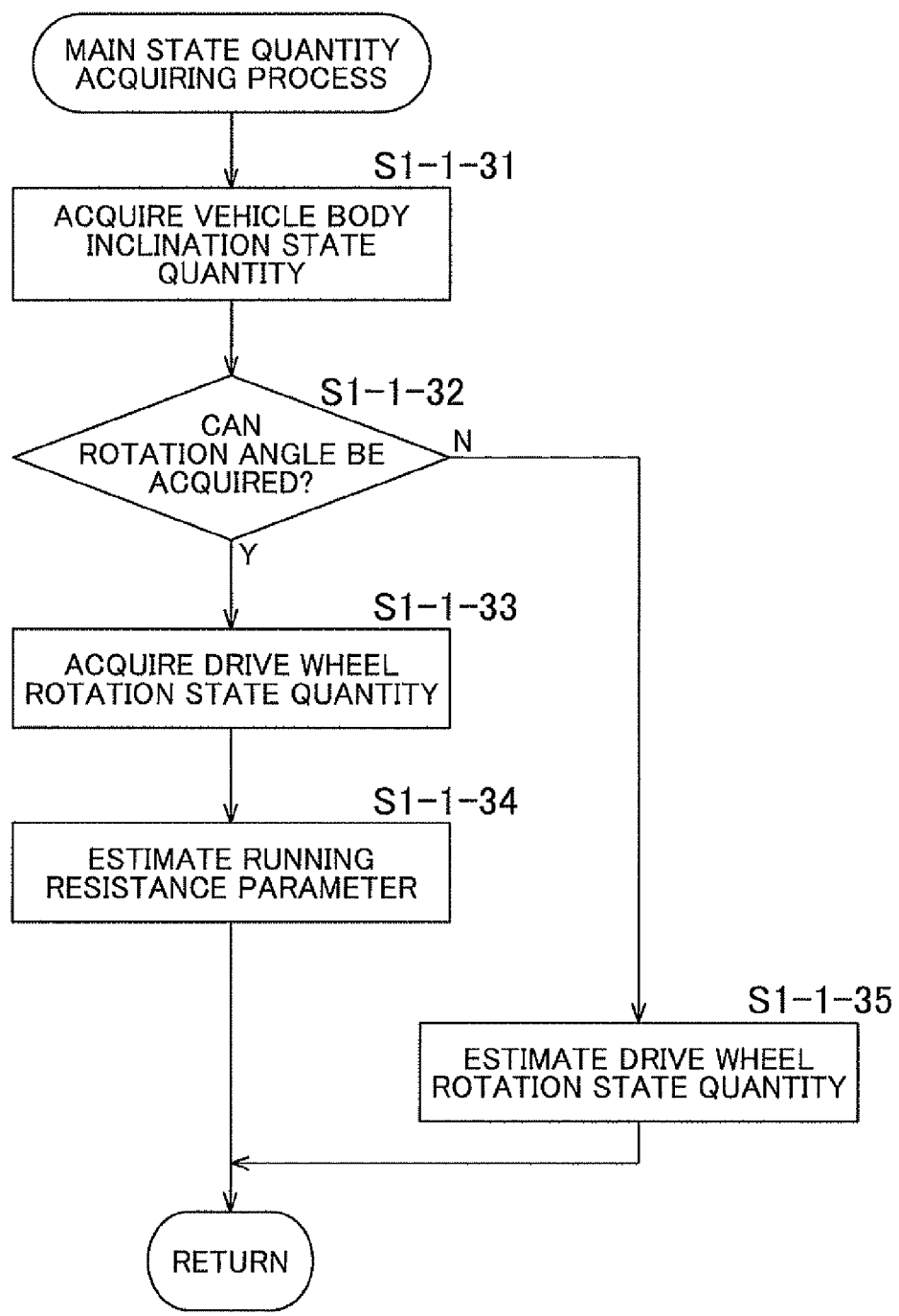
FIG. 12 is a flow chart showing operations of a main state quantity acquiring process in a fourth embodiment of the present invention.

FIG. 12 is a flow chart showing operations of the main state quantity acquiring process in the fourth embodiment of the present invention.

In this embodiment, when the drive wheel rotation angular velocity is estimated, the drive wheel rotation angular velocity estimated value is determined using only the dynamic model relating to rotational movement of the drive wheel 12 and the estimated value of the running resistance torque, without using the dynamic model relating to vehicle body tilting movement and the estimated value of the vehicle body center-of-gravity deviation amount.

If a center-of-gravity position of the riding section 14 (including the occupant 15 riding and other articles loaded on the riding section 14) changes after the acquisition of the measured value of the drive wheel rotational condition becomes impossible, accuracy in estimating and controlling the drive wheel rotation angular velocity may be degraded. For example, in the case in which the vehicle body center-of-gravity deviation amount estimated value immediately before acquisition of the measured value of the drive wheel rotational condition becomes impossible is to be used, if the vehicle body center-of-gravity deviation amount changes with a change in the center-of-gravity position of the riding section (a change in posture of the occupant 15 and a change in conditions of the articles loaded on the riding section 14) occurring thereafter, an error is caused in estimation of the drive wheel rotation angular velocity using the same. Therefore, it is desirable to assure great safety and convenience without restraining the posture of the occupant or the condition of the article loaded.

Thus, in this embodiment, the drive wheel rotation angular velocity is determined using only the running resistance parameter estimated value. Specifically, the drive wheel rotation angular velocity is estimated based on a relationship between the angular velocity and the angular acceleration of the drive wheel 12. This eliminates the need for estimation of the drive wheel rotation angular acceleration using the vehicle body center-of-gravity deviation amount.

This prevents control accuracy from being degraded when the posture of the occupant 15 or the condition of the article loaded changes after the acquisition of the measured value of the drive wheel rotational condition becomes impossible. The vehicle 10 of an inverted pendulum type offering safety and convenience can therefore be provided without restraining the posture of the occupant or the condition of the article loaded.

The main state quantity acquiring process in this embodiment will be described below. It is to be noted that the overview of the running and posture control process, the state quantity acquiring process, the target running condition determining process, the target vehicle body posture determining process, and the actuator output determining process are the same as those in the first embodiment, and descriptions thereof will be omitted.

In the main state quantity acquiring process, the main control ECU 21 first acquires the vehicle body inclination state quantity (step S1-1-31). In this case, the vehicle body inclination angle $\theta_1$ and/or the inclination angular velocity $\dot{\theta}_1$ are acquired from the vehicle body inclination sensor 41.

Then, the main control ECU 21 determines whether a rotational angle can be acquired (step S1-1-32). Specifically, it is determined whether the drive wheel rotational angle $\theta_W$ as the drive wheel rotation state quantity can be acquired from the drive wheel sensor 51 and, if the drive wheel rotational angle $\theta_W$ can be acquired, it is determined whether the measured value thereof can be used for control. It is determined that the drive wheel rotational angle $\theta_W$ cannot be acquired if, for example, data is yet to be received, a faulty condition notification signal is received, and erroneous data is received.

If the rotational angle can be acquired, the main control ECU 21 acquires the drive wheel rotation state quantity (step S1-1-33). Specifically, the drive wheel rotational angle $\theta_W$ and/or the rotation angular velocity $\dot{\theta}_W$ are acquired from the drive wheel sensor 51.

Then, the main control ECU 21 estimates the running resistance parameter (step S1-1-34). Specifically, from the time history of each state quantity and the drive torque, the running resistance parameter is estimated using Expression (2) described earlier in the first embodiment.

If it is determined that the rotational angle cannot be acquired, on the other hand, the main control ECU 21 estimates the drive wheel rotation state quantity (step 1-1-35). Specifically, from the time history of each state quantity and the drive torque, and the running resistance parameter, the drive wheel rotation angular velocity is estimated using Expression (9) as follows.

[Numerical Expression 9]

$$\theta_W = \theta_W^{(n)}$$

$$\dot{\theta}_W^{(n)} = \zeta_W \tilde{\dot{\theta}}_W + (1-\zeta_W)\dot{\theta}_W^{(n-1)}$$

$$\tilde{\dot{\theta}}_W = \frac{\tilde{\tau}_D - \tau_{D0}}{C_D}$$

$$\tilde{\tau}_D = \tau_W - \tau_{D,M}$$

$$\tau_{D,M} = R_W\left(\tilde{M}R_W\hat{\ddot{\theta}}_W + m_1 l_1 \ddot{\theta}_1\right)$$

$$\hat{\ddot{\theta}}_W = \frac{\dot{\theta}_W^{(n-1)} - \dot{\theta}_W^{(n-2)}}{\Delta t}$$

Expression (9)

The upper five equations of Expression (9) are the same as those in Expression (8). Constants and the like in the expression are also the same as those previously described in Expression (8).

In this embodiment, the drive wheel rotation angular velocity is estimated based on the dynamic model relating to rotational movement of the drive wheel 12, using the time history of the vehicle body inclination condition and the drive torque, and the parameter estimated value. At this time, the running resistance torque is estimated, with the drive torque, inertia relative to acceleration and deceleration of the vehicle 10, effects from movement of the center of gravity as a result of vehicle body inclination, and the running resistance torque taken into consideration, and from a relationship in magnitude thereof. The drive wheel rotation angular velocity is then estimated on the assumption that a linear relationship holds between the running resistance torque and the drive wheel rotation angular velocity. In this manner, an unknown drive wheel rotation angular velocity can be estimated by using theoretical relationships between different conditions in the dynamic model and torque.

The estimated value of the drive wheel rotation angular velocity is determined using the estimated value of the running resistance parameter under the normal condition (in which the measured value of the drive wheel rotational condition by the drive wheel sensor 51 can be acquired and used). Specifically, on the assumption that characteristics of the running resistance torque corresponding to the deviation from the dynamic model relating to rotational movement of the drive wheel 12 do not change from that immediately before acquisition of the drive wheel rotation angular velocity measured value becomes impossible, the estimated value of the drive wheel rotation angular velocity is determined using the estimated value at that particular point in time. With a preparation before the estimation in this manner, a characteristic change in the running resistance that cannot be taken into consideration in the dynamic model can be considered to some extent. Specifically, by estimating errors in the dynamic model using the measured value that is a true value before the estimation by the dynamic model, the errors can be taken into consideration during actual estimation.

Additionally, the drive wheel rotation angular velocity is estimated based on the relationship between the angular velocity and the angular acceleration of the drive wheel 12. At this time, the drive wheel rotation angular velocity is given as a time derivative (difference) of the drive wheel rotation angular velocity. Specifically, based on the time history of the drive wheel rotation angular velocity estimated values up to that particular point in time, the drive wheel rotation angular velocity at that particular point in time is estimated. In other words, the estimated value of the drive wheel rotation angular velocity is found by solving a first-order differential equation of the drive wheel rotation angular velocity including acceleration through numerical integration. It is to be noted that the drive wheel rotation angular velocity measured value acquired last is used as an initial value. As such, a dynamic model relating to the vehicle body center-of-gravity deviation amount, specifically, the dynamic model relating to vehicle body inclination is not used, so that the estimated value of the drive wheel rotation angular velocity is not affected by errors in estimation of the vehicle body center-of-gravity position. The drive wheel rotation angular velocity can thus be estimated with equivalent accuracy, even if the vehicle body center-of-gravity position (posture of the occupant 15 or the condition of the article loaded) changes after the acquisition of the drive wheel rotation condition measured value becomes impossible.

Furthermore, effects from noise and the like are eliminated using a low-pass filter. At this time, to prevent delay in the estimated value from affecting vehicle body posture control (inverted pendulum control), the time constant of the filter is set to be shorter than the characteristic time of the vehicle body inclination.

In this embodiment, the drive wheel rotation angular velocity is estimated using a simple linear model. However, the estimation may be made using an even stricter model. For example, a model that takes into account a nonlinear effect may be used for even stricter estimation. Alternatively, the estimation may also be made using an even simpler model.

In addition, in this embodiment, the drive wheel rotation angular acceleration is evaluated by a backward difference using past data only. However, a difference equation including current data may be used. Another calculation method may also be used for numerical time integration. For example, a fourth-order Runge-Kutta method may be used to estimate the drive wheel rotation angular velocity even more accurately.

As described above, in this embodiment, the drive wheel rotation angular velocity estimated value is determined using only the running resistance torque estimated value. This eliminates the need for estimating the drive wheel rotation angular acceleration using the vehicle body center-of-gravity deviation amount, which allows running in inverted posture to be maintained even when the posture of the occupant 15 or the condition of the article loaded changes after the acquisition of the measured value of the drive wheel rotational condition becomes impossible. The vehicle 10 of an inverted pendulum type offering safety and convenience can therefore be provided without restraining the posture of the occupant or the condition of the article loaded.

The drive wheel rotation angular acceleration is determined, in the third embodiment, through the estimation made using the vehicle body tilting movement model including the vehicle body center-of-gravity deviation amount to thereby avoid accumulation of errors involved in integration of the acceleration, and in the fourth embodiment, through the evaluation in terms of the time history of the drive wheel rotation angular velocity to thereby avoid effects from changes in the vehicle body center-of-gravity position. Either method of these two may be selectively employed according to, for example, the use condition.

For example, the method of the third embodiment may be used when the vehicle 10 is running at relatively high speed with the occupant 15 restrained to the riding section 14 using, for example, a seat belt, and the method of the fourth embodiment may be used when the vehicle 10 is running at relatively low speed with the occupant 15 not restrained. Alternatively, the method of the third embodiment may be used, if running needs to be maintained for relatively long hours after the acquisition of the drive wheel rotation angular velocity becomes impossible and the method of the fourth embodiment may be used, if the vehicle can be brought to a stop within a short time. Furthermore, either method may be selected according to an operation of the selector device by the occupant 15.

Making advantages of both methods compatible with each other by taking such an approach as described above allows safety and comfort to be further enhanced.

The above-described third and fourth embodiments include the drive wheel sensor 51 for measuring the rotational condition of the drive wheel 12 and acquisition of the drive wheel rotational condition using the rotation estimating means is performed only when acquisition of the measured value thereof becomes impossible. However, the rotational condition of the drive wheel 12 may be acquired using the rotation estimating means at all times, without providing the drive wheel sensor 51. In addition, the drive wheel sensor 51 may be used for verifying the estimated value.

In the third and fourth embodiments of the present invention, the following may be presented as means for solving the related art problems.

A vehicle includes a drive wheel rotatably attached to a vehicle body and a vehicle controller that controls posture of the vehicle body by controlling drive torque applied to the drive wheel, wherein the vehicle controller includes rotation estimating means for estimating a rotation angular velocity of the drive wheel using an inclination condition of the vehicle body relative to a vertical axis and the drive torque.

In this configuration, the drive wheel rotation angular velocity is estimated from the inclination condition of the vehicle body and the drive torque. This allows running in inverted posture to be maintained without using a measured value by a drive wheel sensor.

In another vehicle, additionally, the vehicle controller determines the drive torque applied to the drive wheel using an estimated value of the rotation angular velocity of the drive wheel estimated by the rotation estimating means.

In this configuration, magnitude of the drive torque is determined according to the estimated value of the drive wheel rotation angular velocity. This allows drive torque with a magnitude appropriate for maintaining a running condition and inverted posture to be applied.

In still another vehicle, additionally, the vehicle controller further includes target value determining means for determining a target value of the rotation angular velocity of the drive wheel according to a target running condition of the vehicle, and the drive torque is applied with a magnitude proportional to a difference between the estimated value estimated by the rotation estimating means and the target value determined by the target value determining means.

In this configuration, the use of a simple technique similar to general feedback control using a drive wheel sensor reduces arithmetic operation load during control and facilitates design of a control system.

In another vehicle, additionally, the vehicle controller further includes rotation measuring means for measuring a rotational condition of the drive wheel and determining means for determining whether the rotational condition can be measured by the rotation measuring means and/or the measured value can be used for control of the vehicle, and the rotation estimating means estimates the rotation angular velocity of the drive wheel if the determining means determines that the measurement and/or the use of the measured value is impossible.

In this configuration, running in inverted posture can be maintained even if acquisition of the measured value of the rotational condition of the drive wheel suddenly becomes impossible due to, for example, a sensor failure and a communication error. In addition, it is possible to prevent an increase in calculating cost involved in an unnecessary process for acquiring the estimated value when the measured value can be acquired.

In still another vehicle, additionally, the vehicle controller determines the drive torque using the measured value of the rotational condition of the drive wheel if the determining means determines that the measurement and/or the use of the measured value is possible, and using the estimated value of the rotation angular velocity of the drive wheel if the determining means determines that the measurement and/or the use of the measured value is impossible.

In this configuration, a situation requiring the estimated value is appropriately identified to thereby change from the measured value to the estimated value, so that control accuracy can be prevented from being degraded as a result of using the estimated value that is typically less accurate than the measured value, specifically, ride comfort or operability can be prevented from being degraded.

In yet another vehicle, additionally, the vehicle controller applies the drive torque with a magnitude proportional to a difference between a rotation angular velocity acquired from the measured value of the rotational condition of the drive wheel and the target value if the determining means determines that the measurement and/or the use of the measured value is possible, and the drive torque with a magnitude proportional to a difference between the estimated value and the target value of the rotation angular velocity of the drive wheel if the determining means determines that the measurement and/or the use of the measured value is impossible.

In this configuration, in vehicle body posture control, a control technique is employed that is common between the case in which the measured value is used and the case in which the estimated value is used, so that the control technique can be simplified and the number of man-hours required for designing the control system can be reduced.

In yet another vehicle, additionally, the vehicle controller further includes resistance torque acquiring means for acquiring running resistance torque of the drive wheel and resistance parameter acquiring means for acquiring a parameter relating to the running resistance torque, and the rotation estimating means estimates the rotation angular velocity of the drive wheel using the running resistance acquired by the resistance torque acquiring means and the resistance parameter acquired by the resistance parameter acquiring means.

In this configuration, by considering the running resistance torque of the drive wheel and the parameter representing characteristics thereof, accuracy in estimating the drive wheel rotation angular velocity can be prevented from being degraded as occurring from changing running speeds or road surface conditions.

In yet another vehicle, additionally, the resistance torque acquiring means estimates the running resistance torque using measured values of the vehicle body inclination condition and/or the drive torque and/or the rotational condition of the drive wheel.

In this configuration, the running resistance torque of the drive wheel is acquired by the estimating means, so that effects from the running resistance torque can be compensated for without adding a device for measuring the running resistance torque.

In yet another vehicle, additionally, the resistance parameter acquiring means estimates the running resistance parameter using measured values of the inclination condition of the vehicle body and/or the drive torque and/or the rotational condition of the drive wheel.

In this configuration, a parameter representing characteristics of the running resistance torque of the drive wheel is acquired by the estimating means, so that effects from a characteristic change in the running resistance torque can be compensated for without adding a device for measuring conditions relating to running resistance, such as road surface conditions.

In yet another vehicle, additionally, the resistance parameter acquiring means determines the latest resistance parameter when the determining means determines that the measurement and/or the use of the measured value is possible to be the resistance parameter if the determining means determines that the measurement and/or the use of the measured value is impossible.

In this configuration, on the assumption that there is no sudden change in road surface conditions and the like, the estimated value of the running resistance parameter is fixed when acquisition of the measured value of the drive wheel rotational condition becomes impossible. This allows effects from running resistance to be reduced to some extent without acquiring the running resistance parameter, acquisition of which is difficult without the measured value of the drive wheel rotational condition.

In yet another vehicle, additionally, the vehicle controller further includes rotation angular acceleration estimating means for estimating rotation angular acceleration of the drive wheel using the inclination condition of the vehicle body and the drive torque, and the estimated value of a rotational speed of the drive wheel is corrected using the estimated value of the rotation angular acceleration estimated by the rotation angular acceleration estimating means.

In this configuration, the drive wheel rotation angular acceleration is estimated using another dynamic model, so that calculation for estimating the drive wheel rotation angular velocity can be made even more stabilized and simpler.

In yet another vehicle, additionally, the vehicle controller further includes center-of-gravity deviation amount acquiring means for acquiring a center-of-gravity position deviation amount of the vehicle body, and the rotation estimating means corrects the estimated value of the rotation angular acceleration using the center-of-gravity deviation amount acquired by the center-of-gravity deviation amount acquiring means.

In this configuration, by taking into consideration the deviation in the center-of-gravity position of the vehicle body, degradation of accuracy in estimating the drive wheel rotation angular acceleration and the drive wheel rotational speed as a result of a difference in weight or riding posture of the occupant, or weight or a loading position of the article loaded can be prevented.

In yet another vehicle, additionally, the center-of-gravity deviation amount acquiring means estimates the center-of-gravity deviation amount using measured values of the inclination condition of the vehicle body and/or the drive torque and/or the rotational condition of the drive wheel.

In this configuration, the deviation amount of the center-of-gravity position of the vehicle body is acquired by the estimating means, so that effects from the deviation in the center-of-gravity position can be compensated for without adding a device for measuring the center-of-gravity position.

In yet another vehicle, additionally, the center-of-gravity deviation amount acquiring means determines the latest center-of-gravity deviation amount when the determining means determines that the measurement and/or the use of the measured value is possible to be the center-of-gravity deviation amount if the determining means determines that the measurement and/or the use of the measured value is impossible.

In this configuration, on the assumption that there is no sudden change in the center-of-gravity position of the vehicle body, the estimated value of the center-of-gravity deviation is fixed when acquisition of the measured value of the vehicle body inclination angle becomes impossible. This allows effects from deviation in the center-of-gravity position to be reduced to some extent without acquiring the center-of-gravity deviation amount, acquisition of which is difficult without the measured value of the vehicle body inclination angle.

A fifth embodiment of the present invention will be described below.

In the related art vehicle described in "BACKGROUND ART", posture of the vehicle body is controlled using the measured value of the inclination condition of the vehicle body acquired by a sensor. If a correct measured value cannot be acquired as the measured value, specifically, in the case of an abnormal condition, it becomes necessary to detect the abnormality and perform control in accordance with the abnormal condition. For example, if a sensor fails, the measured value of the sensor may be determined to be abnormal when a signal indicative of a faulty condition transmitted from the sensor is received.

However, if an abnormal measured value is received because of a sensor reference angle deviated due to, for example, a deformed sensor mounting portion, or a communication error, the abnormality cannot be detected because such abnormality is not caused by a failure of the sensor itself.

In preparation for such a situation, it is conceivable that a plurality of sensors and communication means are prepared in advance. However, providing a plurality of sensors and communication means makes a system costly and complicated. Specifically, it is difficult for a low-priced, simple system to assure sufficient safety and convenience.

It is an object of the fifth embodiment of the present invention to solve the above-described problems of the related art vehicles and to provide a safer and lower-priced vehicle that detects reliably an abnormality of the measured value of the vehicle body inclination condition, by comparing the measured value with the estimated value of the vehicle body inclination condition.

Parts of the same configurations as those in the first to fourth embodiments are denoted by the same reference numerals, and descriptions of those parts will be omitted. Descriptions of the same operations and the same effects as in the first through fourth embodiments will also be omitted.

Figure 13:
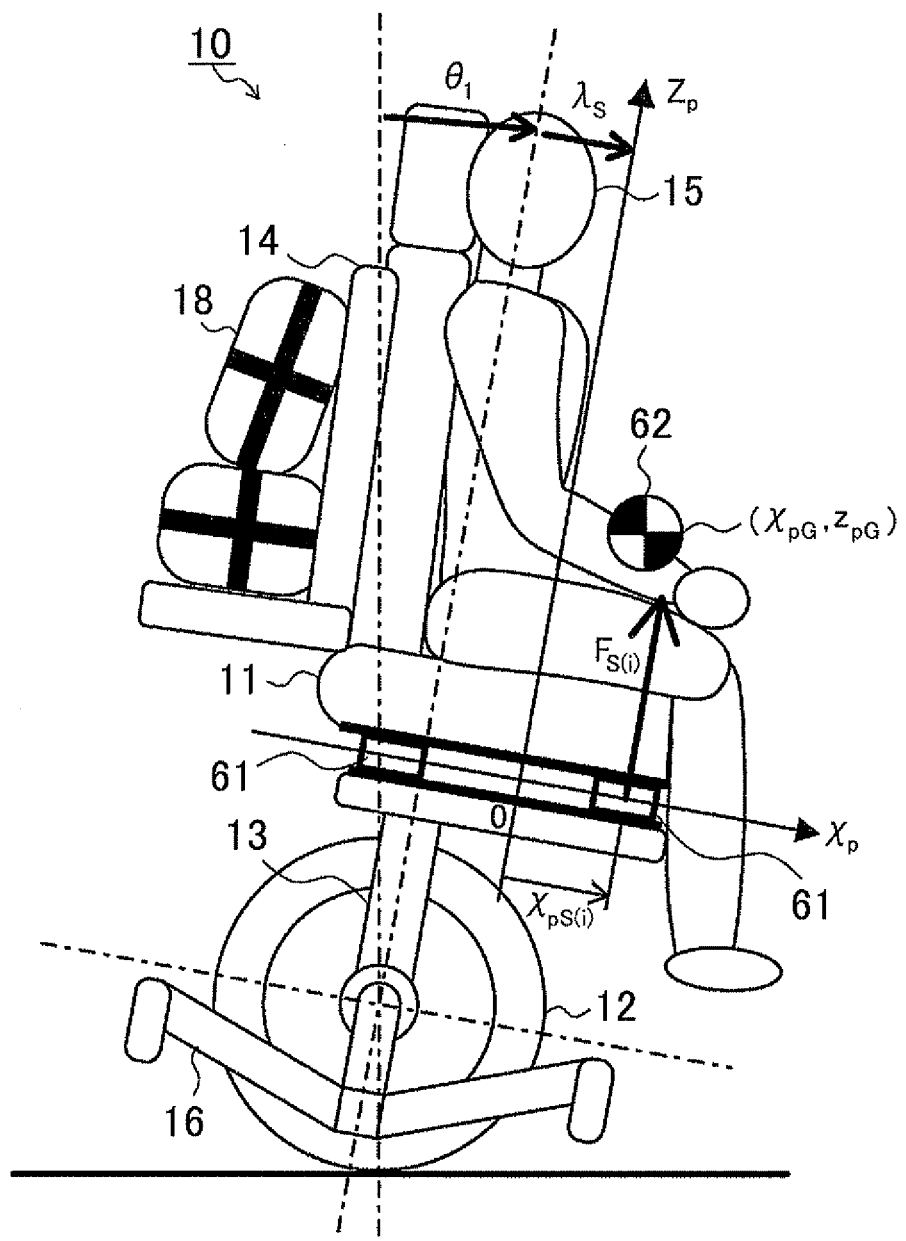
FIG. 13 is an illustration showing a configuration of a vehicle according to a fifth embodiment of the present invention.
Figure 14:
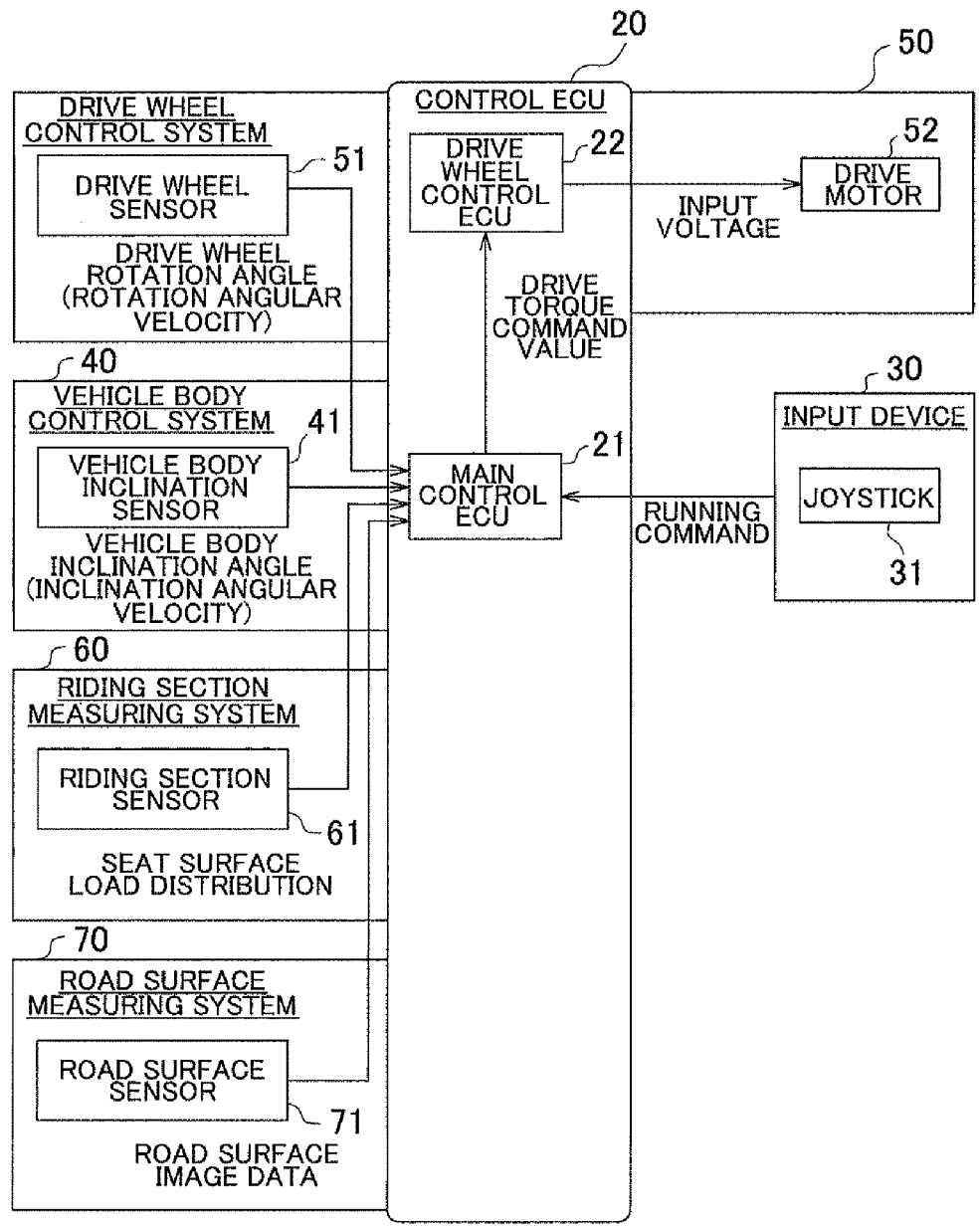
FIG. 14 is a block diagram showing a configuration of a control system of the vehicle according to the fifth embodiment of the present invention.

FIG. 13 is an illustration showing a configuration of a vehicle according to the fifth embodiment of the present invention. FIG. 14 is a block diagram showing a configuration of a control system of the vehicle according to the fifth embodiment of the present invention.

In FIG. 13, reference numeral 10 denotes a vehicle in this embodiment that includes a main unit 11 of a vehicle body, a drive wheel 12, a support section 13, and a riding section 14 on which an occupant 15 rides and an article 18 is loaded. The vehicle 10 is adapted to be capable of inclining the vehicle body in a front-rear direction. Posture of the vehicle body is controlled using posture control of an inverted pendulum. In the example shown in FIG. 13, the vehicle 10 moves forward in a rightward direction and backward in a leftward direction.

For convenience sake, in this embodiment, a case in which the occupant 15 rides and the article 18 such as a cargo is loaded on the riding section 14. However, the occupant 15 does not necessarily ride on the riding section 14. For example, if the vehicle 10 is operated through remote control, the occupant 15 may not ride on the riding section 14. Similarly, the article 18 is not necessarily be loaded on the riding section 14, and the article 18 may be omitted.

An indicator lamp, although not shown, as notification means is disposed on an input device 30. If the vehicle 10 is in an abnormal condition, the indicator lamp is lit up steadily to thereby notify the occupant 15 of such abnormal condition.

It is to be noted that, instead of the indicator lamp, a device such as a display showing predetermined contents on a screen and a speaker emitting a predetermined sound or voice may be used as the notification means.

In addition, a stopper 16 as posture limiting means is mounted on the support section 13 of the vehicle 10. When the inverted pendulum control is stopped, a stopper ground contact point at either a front end or a rear end of the stopper 16 contacts the road surface to thereby limit a posture angle of the vehicle body, thus preventing the vehicle body from tilting to a predetermined angle, specifically, a vehicle body inclination angle limit value or more.

Additionally, the vehicle 10 also includes a control ECU 20 as a vehicle controller. The control ECU 20 includes a main control ECU 21 and a drive wheel control ECU 22. The control ECU 20, and the main control ECU 21 and the drive wheel control ECU 22, include arithmetic means such as a CPU and an MPU, storage means such as a magnetic disk and a semiconductor memory, and an input/output interface, thereby constituting a computer system for controlling an operation of each part of the vehicle 10. The control ECU 20, the main control ECU 21, and the drive wheel control ECU 22 are disposed in, for example, the main unit 11, or alternatively, may be disposed in the support section 13 or the riding section 14. In addition, the main control ECU 21 and the drive wheel control ECU 22 may be configured separately or integrally.

The main control ECU 21 functions, together with the drive wheel control ECU 22, a drive wheel sensor 51, and a drive motor 52, as part of a drive wheel control system 50 for controlling operations of the drive wheel 12. The drive wheel sensor 51 is formed of a resolver, an encoder, and the like, and functions as a drive wheel rotational condition measuring device. The drive wheel sensor 51 detects a drive wheel rotational angle and/or rotation angular velocity that represents a rotational condition of the drive wheel 12 and transmits the same to the main control ECU 21. In addition, the main control ECU 21 transmits a drive torque command value to the drive wheel control ECU 22 which, in turn, supplies the drive motor 52 with an input voltage corresponding to the drive torque command value received. The drive motor 52 then applies the drive torque to the drive wheel 12 according to the input voltage, thus functioning as a driving actuator.

The main control ECU 21 functions, together with the drive wheel control ECU 22, a vehicle body inclination sensor 41, and the drive motor 52, as part of a vehicle body control system 40 for controlling the posture of the vehicle body. The vehicle body inclination sensor 41 is formed of an acceleration sensor, a gyro sensor and the like. Functioning as inclination measuring means, the vehicle body inclination sensor 41 detects a vehicle body inclination angle and/or inclination angular velocity indicating the inclination condition of the vehicle body and transmits the same to the main control ECU 21. The main control ECU 21 then transmits the drive torque command value to the drive wheel control ECU 22.

Additionally, the main control ECU 21 functions, together with a riding section sensor 61 as load distribution measuring means, as part of a riding section measuring system 60 for measuring a seat surface load distribution of the riding section 14. The riding section sensor 61 is formed of a plurality of single-axis load sensors disposed at a mounting portion of the riding section 14, and detects, as loaded load parameters, weights and load distributions of the occupant 15 and the article 18 on the riding section 14 and transmits the same to the main control ECU 21.

Furthermore, the main control ECU 21 functions, together with a road surface sensor 71 as road surface shape measuring means, as part of a road surface measuring system 70 for measuring road surface conditions. The road surface sensor 71 is formed of an image sensor such as an imaging device disposed on the front and rear of the vehicle body, for example, at a front or rear end on the underside of the main unit 11, and transmits imaged road surface image data to the main control ECU 21.

In addition, the main control ECU 21 receives an input of a running command from a joystick 31 of the input device 30. The main control ECU 21 then transmits the drive torque command value to the drive wheel control ECU 22.

Furthermore, the main control ECU 21 functions as inclination estimating means for estimating the inclination condition of the vehicle body. In addition, the main control ECU 21 also functions as determining means for determining whether it is possible to acquire the measured value of the inclination condition of the vehicle body and use the measured value for control, center-of-gravity deviation amount acquiring means for acquiring the vehicle body center-of-gravity deviation amount, and resistance parameter acquiring means for acquiring the running resistance parameter.

It is to be noted that each of the sensors may be a type for acquiring a plurality of state quantities. For example, an acceleration sensor and a gyro sensor may be used in combination as the vehicle body inclination sensor 41 to thereby determine the vehicle body inclination angle and/or inclination angular velocity from measured values of both. Symbols other than reference numerals described on FIG. 13 will be described later.

Operation of the vehicle 10 having the foregoing configuration will be described below. First, an overview of a running and posture control process will be described.

Figure 15:
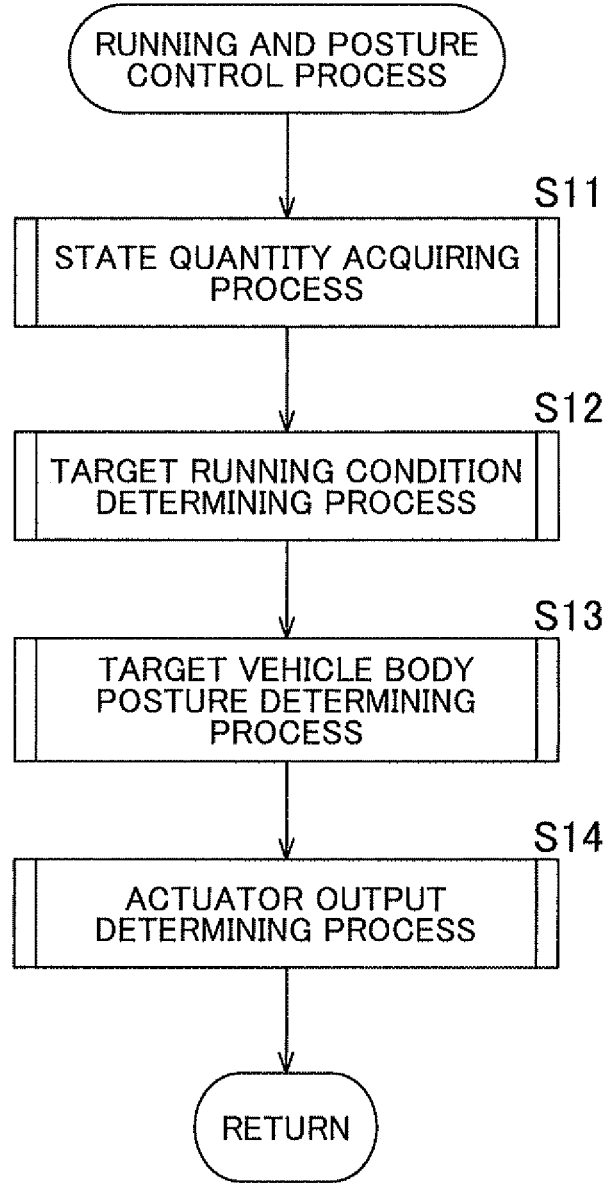
FIG. 15 is a flow chart showing operations of a running and posture control process of the vehicle according to the fifth embodiment of the present invention.

FIG. 15 is a flow chart showing operations of the running and posture control process of the vehicle according to the fifth embodiment of the present invention.

In this embodiment, the measured value of the vehicle body inclination condition taken by the vehicle body inclination sensor 41 is compared with the estimated value to thereby detect an abnormality in the vehicle body inclination angle measured value. Specifically, the vehicle body inclination angle is estimated from the time history of the drive wheel rotation angular acceleration and the drive torque. The estimated value of the vehicle body inclination angle is corrected using the measured value of the vehicle body center-of-gravity deviation amount taken by the riding section sensor 61. Furthermore, the vehicle body inclination angular acceleration is estimated using another dynamic model and corrected according to a running resistance estimated value. Then, if a difference between the measured value and the estimated value of the vehicle body inclination angle is greater than a predetermined value, the vehicle body inclination angle measured value is regarded as being abnormal. This allows the abnormality in the vehicle body inclination angle measured value to be reliably detected, so that the vehicle 10 of an inverted pendulum type offering greater safety and convenience at a lower cost can be provided.

In the running and posture control process, the control ECU 20 first performs a state quantity acquiring process (step S11) to thereby acquire the rotational condition of the drive wheel 12 and the inclination condition of the vehicle body using each sensor, specifically, the drive wheel sensor 51, the vehicle body inclination sensor 41, the riding section sensor 61, the road surface sensor 71, and state quantity estimating means.

Next, the control ECU 20 performs a target running condition determining process (step S12), and determines a target value of acceleration of the vehicle 10 and a target value of the rotation angular velocity of the drive wheel 12 based on an operation amount of the joystick 31.

Next, the control ECU 20 performs a target vehicle body posture determining process (step S13), and determines a target value of the vehicle body inclination angle as a target value of the vehicle body posture based on the target value of acceleration of the vehicle 10 and the target value of the rotation angular velocity of the drive wheel 12 that are determined through the target running condition determining process.

Finally, the control ECU 20 performs an actuator output determining process (step S14), and determines the output of each actuator, specifically, the output of the drive motor 52, based on each of the state quantities acquired by the state quantity acquiring process, the target running condition determined through the target running condition determining process, and the target vehicle body posture determined through the target vehicle body posture determining process.

The running and posture control process will be described in detail below. First, the state quantity acquiring process will be described.

Figure 16:
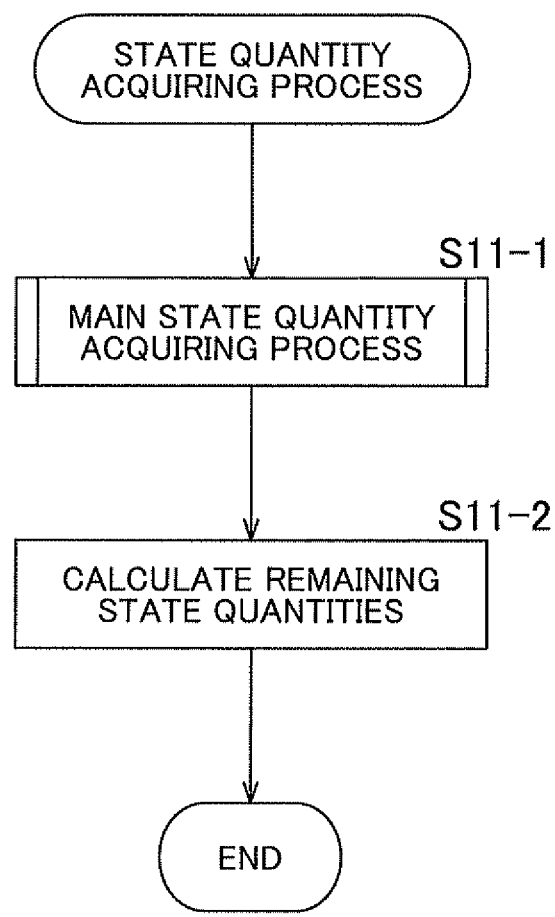
FIG. 16 is a flow chart showing operations of a state quantity acquiring process in the fifth embodiment of the present invention.

FIG. 16 is a flow chart showing operations of a state quantity acquiring process in the fifth embodiment of the present invention.

In this embodiment, state quantities, inputs, parameters, physical constants, and the like will be represented by the following symbols. It is to be noted that FIG. 13 shows part of the state quantities and the parameters. In addition, in FIG. 13, $x_p$ denotes a front-rear direction coordinate axis of the vehicle body, $z_p$ denotes a vertical coordinate axis of the vehicle body, and reference numeral 62 denotes a center-of-gravity position (coordinates: $x_{pG}$, $z_{pG}$) of the occupant 15 and the article 18.

$F_{S(i)}$: Riding section sensor measured value (with a positive tensile load; suffix (i) denotes the i-th sensor)

$x_{pS(i)}$: Riding section sensor position (suffix (i) denotes the i-th sensor)

$\theta_1$: Vehicle body inclination angle $\lambda_S$: Riding section position $\alpha$: Vehicle acceleration [G]

$m_{S0}$: Weight of the riding section excluding the occupant (article)

$x_{S0}$: Center-of-gravity position of the riding section excluding the occupant (article)

$l_1$: Distance between the axle and the center of gravity of the riding section (reference value)

$f_0$: Angular velocity-converted frequency (predetermined value)

$\theta_{R,sh}$: Inertia force inclination angle threshold value (predetermined value)

$\alpha_{S,sh}$: Riding section relative acceleration threshold value (predetermined value)

$\zeta_0 = \Delta t / T_{LPF}$ $\Delta t$: Riding section sensor measuring cycle (predetermined value)

$T_{LPF}$: Low-pass filter time constant (predetermined value)

In the state quantity acquiring process, the main control ECU 21 first performs a main state quantity acquiring process for acquiring a drive wheel rotation state quantity and a vehicle body inclination state quantity that serve as the main state quantities (step S11-1).

The main control ECU 21 then calculates remaining state quantities (step S11-2). In this case, the remaining state quantities are calculated by differentiating or integrating the acquired state quantities with respect to time. For example, if the state quantities acquired by the main state quantity acquiring process are drive wheel rotational angle $\theta_W$ and vehicle body inclination angle $\theta_1$, the drive wheel rotational angle $\theta_W$ and the vehicle body inclination angle $\theta_1$ are differentiated with respect to time to acquire rotation angular velocity $\dot{\theta}_W$ and inclination angular velocity $\dot{\theta}_1$. Alternatively, if the state quantities acquired are rotation angular velocity $\dot{\theta}_W$ and inclination angular velocity $\dot{\theta}_1$, the rotation angular velocity $\dot{\theta}_W$ and the inclination angular velocity $\dot{\theta}_1$ are integrated with respect to time to acquire the drive wheel rotational angle $\theta_W$ and the vehicle body inclination angle $\theta_1$.

The main state quantity acquiring process will be described below.

Figure 17:
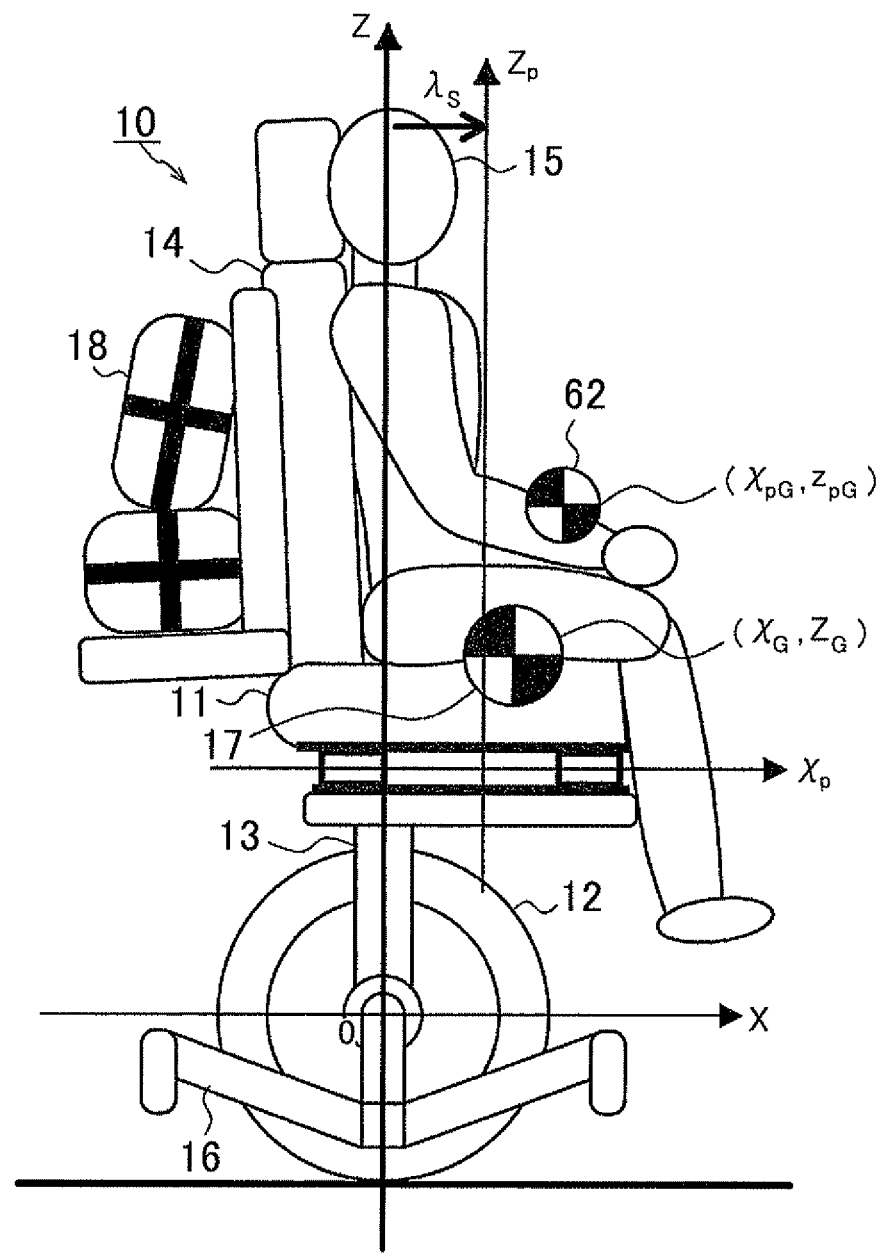
FIG. 17 is an illustration showing a position of each of the centers of gravity of the vehicle according to the fifth embodiment of the present invention.
Figure 18:
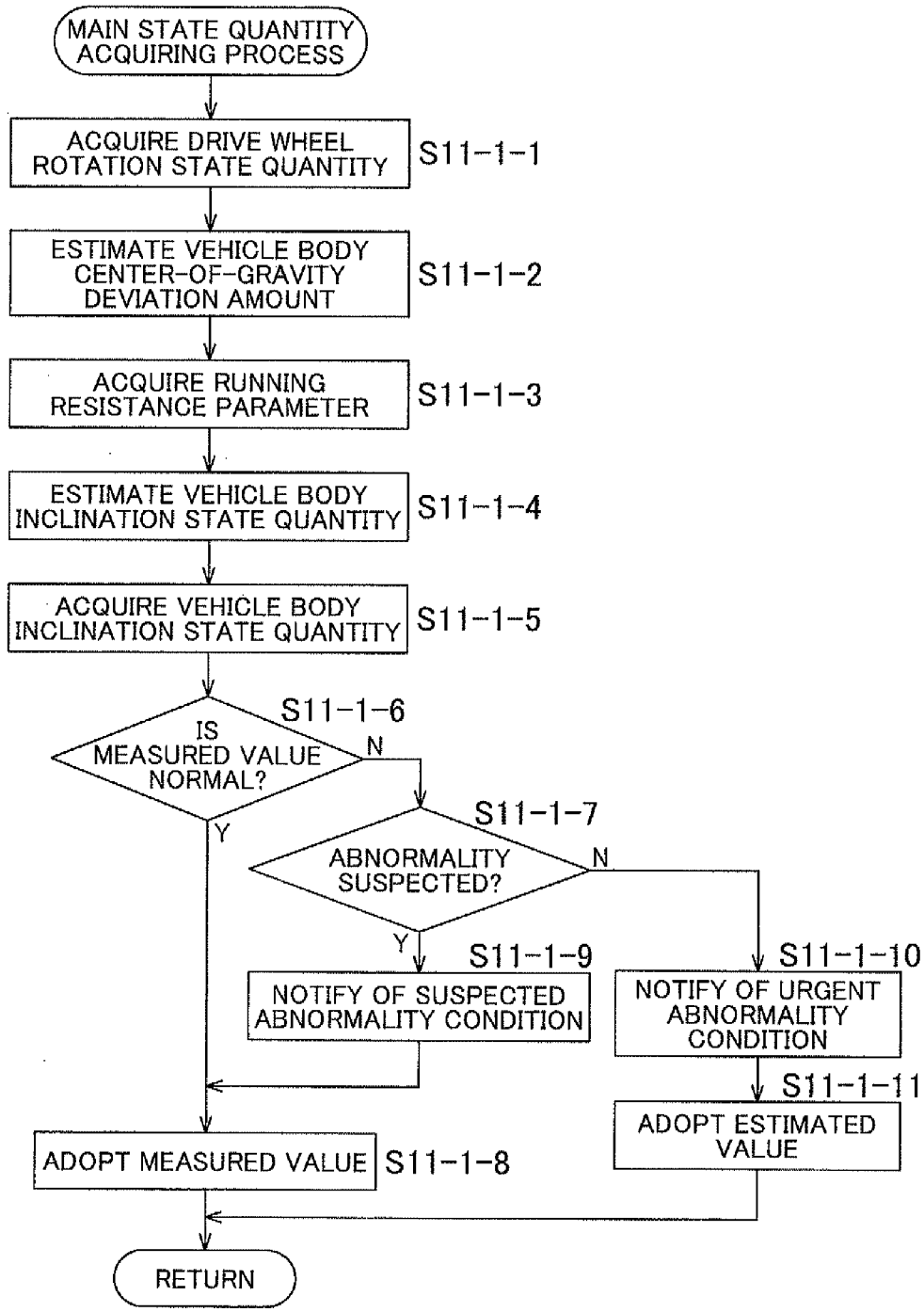
FIG. 18 is a flow chart showing operations of a main state quantity acquiring process in the fifth embodiment of the present invention.

FIG. 17 is an illustration showing a position of each of the centers of gravity of the vehicle according to the fifth embodiment of the present invention. FIG. 18 is a flow chart showing operations of the main state quantity acquiring process in the fifth embodiment of the present invention.

In the main state quantity acquiring process, the main control ECU 21 first acquires the drive wheel rotation state quantity (step S11-1-1). In this case, the drive wheel rotational angle $\theta_W$ and/or the rotation angular velocity $\dot{\theta}_W$ are acquired from the drive wheel sensor 51.

Then, the main control ECU 21 estimates the vehicle body center-of-gravity deviation amount (step S11-1-2). Specifically, a weight $m_p$ of the occupant 15 and the article 18 is acquired using the following expression. It is to be noted that, in FIG. 17, reference numeral 17 denotes the center-of-gravity position (coordinates: $X_G$, $Z_G$) of the vehicle 10.

$m_p = m_S^{(n)} - m_{S0}$ $m_S^{(n)} = \zeta_0 \hat{m}_S + (1-\zeta_0) m_S^{(n-1)}$ $\hat{m}_S = -F_S/g$     [Numerical Expression 10]

Additionally, a center-of-gravity position $x_{pG}$ of the occupant 15 and the article 18 is acquired using the following expression.

[Numerical Expression 11]

$$x_{pG} = (m_S^{(n)} x_S^{(n)} - m_{S0} x_{S0})/m_p$$

$$x_S^{(n)} = \zeta_x \hat{x}_S + (1 - \zeta_x) x_S^{(n-1)}$$

$$\hat{x}_S = -M_S/(\hat{m}_S g) + (\theta_1 - \alpha) z_S^{(n)}$$

$$\zeta_x = \begin{cases} \zeta_0 & (\theta_R \leq \theta_{R,sh} \text{ and } \alpha_S \leq \alpha_{S,sh}) \\ 0 & (\theta_R > \theta_{R,sh} \text{ or } \alpha_S > \alpha_{S,sh}) \end{cases}$$

In these expressions, a superscript (n) denotes the n-th data item in a time series. A predetermined reference value is given in advance for a default value of each time-series data item.

[Numerical Expression 12]

In addition, $$F_S = \sum_i F_{S(i)} \quad M_S = -\sum_i F_{S(i)} x_{pS(i)}$$

$$\theta_R = |\theta_1 - \alpha| \quad \alpha_S = l_1(|\ddot{\theta}_1| + f_0|\dot{\theta}|)/g$$

where, $F_S$ denotes a vertical force acting on the riding section 14, $M_S$ denotes a pitching moment acting on the riding section 14, $\theta_R$ denotes a gradient of a resultant force (sum of a gravitational force and an inertia force) acting on the riding section 14 relative to a vertical axis, and $\alpha_s$ denotes a riding section acceleration added amount by a vehicle body tilting movement and a riding section translational movement.

Thus, in this embodiment, the loaded load parameters are estimated based on the measured values of a plurality of the riding section sensors 61; specifically, the weight $m_p$ that is a sum of the occupant 15 and the article 18 and the center-of-gravity position thereof are estimated. Specifically, the weight $m_p$ is estimated based on the sum of the measured values taken by the riding section sensors 61. The center-of-gravity position is estimated based on a load distribution at front and rear of the riding section 14 measured by the plurality of riding section sensors 61.

Here, if $\theta_R \leq \theta_{R,sh}$, specifically, if the resultant force of the gravitational force and the inertia force acts on the riding section 14 in a relatively vertical direction (e.g., in an upright standstill condition), only the value of the center-of-gravity position $x_{pG}$ is corrected based on the load distribution.

Alternatively, if $\theta_R > \theta_{R,sh}$, specifically, if the resultant force of the gravitational force and the inertia force acts on the riding section 14 in a relatively horizontal direction (e.g., during vehicle body tilting and acceleration/deceleration of the vehicle 10), only the value of the center-of-gravity height $z_{pG}$ is corrected based on the load distribution.

Specifically, in the estimation of the center-of-gravity position and the center-of-gravity height, the cause of the pitching moment acting on the riding section 14 is taken into consideration. If the center-of-gravity height hardly contributes to the pitching moment, the center-of-gravity position is estimated highly accurately, and if the center-of-gravity height contributes to some extent to the pitching moment, the center-of-gravity height is estimated based on the center-of-gravity position previously estimated. In addition, when one of the values is being estimated, the other value is fixed. This allows the center-of-gravity position to be highly accurately estimated using only the riding section sensors 61.

If vehicle body posture significantly changes, the center-of-gravity position estimated value is fixed. If $\alpha_s > \alpha_{S,sh}$, specifically, if the vehicle body inclination angular velocity or angular acceleration is greater than a predetermined threshold value, the estimated value of the center-of-gravity position is not corrected and the preceding estimated value is maintained. In this manner, the cause of the pitching moment acting on the riding section 14 is taken into consideration, and only if it is determined that the pitching moment is attributable only to a difference in the center-of-gravity position, the center-of-gravity position is estimated. A highly accurate and steady estimation can therefore be made using the riding section sensors 61 only, while avoiding effects from a change in vehicle body posture that represents a phenomenon unique to the inverted pendulum type vehicle.

In this embodiment, the center-of-gravity position is estimated based on the measured values of the seat surface load distribution taken by the plurality of riding section sensors 61. Other sensors may also be added for the estimation. For example, a shape sensor that acquires the shape of the occupant 15 and the article 18 using a laser radar or the like may be provided so as to estimate the center-of-gravity height based on the shape acquired.

An even simpler system may also be used for the riding section sensor 61. For example, only one riding section sensor 61 is provided and the center-of-gravity position may be estimated from the weight as the measured value measured thereby, based on statistical findings. Alternatively, an input device may be provided instead of the sensor, and the occupant 15 may input or transmit such data as weight and height of the occupant 15 and weight and shape of the article 18 using the input device so as to estimate the center-of-gravity position based on the data.

Based on the weight $m_p$ and the center-of-gravity position $x_{pG}$ representing the occupant parameters acquired, the main control ECU 21 estimates a vehicle body center-of-gravity deviation amount $\delta_x$ using Expression (10) as follows.

[Numerical Expression 13]

$$\delta_x = \frac{m_p + m_{S0}}{m_1} \lambda_S + \frac{m_p}{m_1} x_{pG} + \frac{m_{1b}}{m_1} \delta_{x0} \quad \text{Expression (10)}$$

In this expression, $m_{1e}$ denotes a vehicle weight without the occupant 15 and the article 18 and $\delta_{x0}$ denotes the center-of-gravity position when the reference position of the riding section 14 is on a perpendicular axis passing through the drive wheel ground contact point in an upright position without the occupant 15 and the article 18.

In this embodiment, the vehicle body center-of-gravity deviation amount $\delta_x$ is estimated based on the occupant parameters as described above. Specifically, a difference from the reference value is considered for the center-of-gravity position of the occupant 15 and the article 18. Estimation and determination with even higher accuracy can be achieved by identifying actual vehicle body parameters in this manner.

Then, the main control ECU 21 acquires the running resistance parameters (step S11-1-3). Specifically, a running resistance constant $\tau_{D0}$ is determined using Expression (11) as follows and a running resistance proportionality coefficient $C_D$ is determined using Expression (12) as follows.

$$\tau_{D0}=MgR_w \sin \eta + (1+\beta_R)\tau_{D0,S} \qquad \text{Expression (11)}$$

$$C_D=(1+\beta_R)C_{D,S} \qquad \text{Expression (12)}$$

where, $\eta$ is a road surface gradient determined based on road surface image data acquired by the road surface sensor 71, and $\beta_R$ is a running resistance increasing rate determined also based on the road surface image data acquired by the road surface sensor 71. Furthermore, $\tau_{D0,S}$ and $C_{D,S}$ are running resistance parameter reference values, for which predetermined values are assigned in advance.

In this embodiment, the running resistance constant $\tau_{D0}$ and the running resistance proportionality coefficient $C_D$ as the running resistance parameters are determined based on the road surface information acquired by the road surface sensor 71.

The running resistance parameters are corrected in consideration of the road surface shape. Specifically, the running resistance constant $\tau_{D0}$ is increased according to the road surface gradient $\eta$. It is to be noted that an appropriate value is given as the running resistance constant based on a dynamic model relating to vehicle running conditions on a slope. Estimation of the state quantities and determination of abnormality with high accuracy can thereby be achieved even during running on a slope.

The running resistance proportionality coefficient $C_D$ is corrected in consideration of the road surface condition. Specifically, the road surface condition is estimated based on the road surface image data and the running resistance parameters are corrected accordingly. If a road surface of which running resistance is expected to be high, such as a road with irregularities, is detected, a predetermined positive value is given to the running resistance increasing rate $\beta_R$. If a road surface of which running resistance is expected to be low, such as a concrete road surface, is detected, a predetermined negative value is given to the running resistance increasing rate $\beta_R$. Estimation of the state quantities and determination of abnormality with high accuracy can thereby be achieved regardless of the road surface conditions.

In this embodiment, the running resistance parameters are corrected based on the information acquired by the image sensor serving as the road surface sensor 71. The correction may nonetheless be made by other methods. For example, a navigation system that is capable of acquiring map information including road surface conditions may be provided, and the road surface condition and running resistance parameters may be acquired based on the map information and a current vehicle position. Alternatively, a road surface information input device that is capable of inputting the road surface conditions selectively or quantitatively may be provided, and the road surface condition and running resistance parameters may be acquired based on information inputted by the occupant 15 according to environment of usage.

Then, the main control ECU 21 estimates the vehicle body inclination state quantity (step S11-1-4). Specifically, from the time history of each state quantity and the drive torque, and each estimated parameter, the vehicle body inclination angle is estimated using Expression (13) as follows.

[Numerical Expression 14]

$$\theta_1 = \theta_1^{(n)} \qquad \text{Expression (13)}$$
$$\theta_1^{(n)} = \zeta_\theta \tilde{\theta}_1 + (1-\zeta_\theta)\theta_1^{(n-1)}$$
$$\tilde{\theta}_1 = \theta_{1,M} - \delta_x$$
$$\theta_{1,M} = \frac{1}{m_1 g l_1}\left(I_1 \hat{\ddot{\theta}}_1 + m_1 l_1 R_W \dot{\theta}_W + \tau_W\right)$$
$$\hat{\ddot{\theta}}_1 = \frac{1}{m_1 l_1 R_W}\left(\tau_W - \tau_D - \tilde{M} R_W^2 \ddot{\theta}_W\right)$$
$$\tau_D = \tau_{D0} + C_D \dot{\theta}_W$$

where, the second equation in Expression (13) corresponds to a process of low-pass filtering. In the expression, $\zeta_\theta$ is a filter coefficient and $\zeta_\theta = \Delta t / T_\theta$ holds. It is to be noted that $T_\theta$ is a low-pass filter time constant. $\Delta t$ and $T_\theta$ are both predetermined values.

Additionally, $\tilde{\theta}_1$ of the third equation denotes a vehicle body inclination angle estimated instantaneous value, and $\theta_{1,M}$ of the fourth equation denotes a model-estimated vehicle body inclination angle.

Furthermore, $\hat{\ddot{\theta}}_1$ denotes a vehicle body inclination angular acceleration estimated value, and $\tau_D$ denotes running resistance torque.

In this embodiment, the vehicle body inclination angle is estimated based on the dynamic model relating to vehicle body tilting movement, using the time history of the drive wheel rotational condition and the drive torque, and parameters. At this time, the vehicle body inclination angle is estimated, with gravitational torque, vehicle body rotational inertia, an inertia force involved in acceleration and deceleration of the vehicle 10, and anti-torque of the drive torque taken into consideration, and from a relationship in magnitude thereof and a proportional relationship between the gravitational torque and the vehicle body inclination angle. In this manner, an unknown vehicle body inclination angle can be estimated by using theoretical relationships between different conditions in the dynamic model and torque.

The estimated value of the vehicle body inclination angle is corrected using the estimated value of the vehicle body center-of-gravity deviation amount. Specifically, accuracy of the estimation is improved by acquiring, through measurement, the vehicle body center-of-gravity deviation amount corresponding to the deviation from the dynamic model relating to vehicle body tilting movement. This makes it possible to prevent effects from the vehicle body center-of-gravity deviation amount from being recognized as an abnormal error of the vehicle body inclination angle measured value, thereby allowing an even more reliable abnormality determination.

Furthermore, the vehicle body inclination angular acceleration is estimated using another dynamic model. Specifically, the vehicle body inclination angular acceleration is regarded as a state quantity independent of the vehicle body inclination angle, and the estimation is made using the dynamic model relating to rotational movement of the drive wheel 12. At this time, effects from the drive torque, inertia relative to acceleration and deceleration of the vehicle, and movement of the center of gravity as a result of vehicle body inclination are taken into consideration. By estimating the vehicle body inclination angular velocity using another model in this manner, accumulation of errors involved in integration of the acceleration and making the estimating calculation unsteady can be avoided, so that a stable and highly accurate estimation of the vehicle body inclination angle is achieved.

In this embodiment, the vehicle body inclination angle is estimated using a simple linear model. However, the estimation may be made using an even stricter model. For example, a model that takes into account a nonlinear effect and an element such as viscous resistance to vehicle body rotation may be used for even stricter estimation. Alternatively, the estimation may also be made using an even simpler model.

Then, the main control ECU 21 acquires the vehicle body inclination state quantity (step S11-1-5).

Specifically, the vehicle body inclination angle $\theta_1$ and/or the inclination angular velocity $\dot{\theta}_1$ are acquired from the vehicle body inclination sensor 41.

Next, the main control ECU 21 determines whether the measured value is normal (step S11-1-6). When it is determined that the measured value is not normal, the main control ECU 21 further determines whether the measured value is suspected to be abnormal (step S11-1-7). Specifically, the measured value is compared with the estimated value to find a deviation therebetween using Expression (14) as follows, deviation evaluation amounts $e_1$ and $e_2$ for the deviation found are calculated using Expression (15) as follows, and it is then determined whether the measured value is normal, and is suspected to be abnormal, based on the calculated deviation evaluation amounts.

[Numerical Expression 15]

$$e^{(k)} = \theta_{1,S}^{(k)} - \theta_{1,E}^{(k)} \quad \text{Expression (14)}$$

where, $\theta_{1,S}^{(k)}$ is a vehicle body inclination angle measured value, and $\theta_{1,E}^{(k)}$ is a vehicle body inclination angle estimated value.

$$e_1 = \frac{1}{N_1} \sum_{k=n-N_1+1}^{n} |e^{(k)}|^M \quad \text{Expression (15)}$$

$$e_2 = \frac{1}{N_2} \sum_{k=n-N_2+1}^{n} |e^{(k)}|^M$$

It is to be noted that $$N_1 = \frac{T_1}{\Delta t} \text{ and } N_2 = \frac{T_2}{\Delta t}.$$

$\Delta t$ is a data acquiring interval (control processing cycle), and $T_1$ and $T_2$ are deviation determining time (predetermined value). It is preferable that $T_1 < T_2$ hold with respect to $T_1$ and $T_2$, and for example, $T_1$ is set to 0.1 [sec.] and $T_2$ is set to 10 [sec.].

If $e_1 > e_{1,sh}$ holds, it is determined that an urgent abnormality occurs, and if $e_2 > e_{2,sh}$ holds, it is determined that an abnormality is suspected. It is to be noted that $e_{1,sh}$ and $e_{2,sh}$ denote deviation determining threshold values, and $$e_{1,sh} = \frac{S_{sh}}{T_1} \text{ and } e_{2,sh} = \frac{S_{sh}}{T_2}$$

hold.

In these expressions, $S_{sh}$ is a time integration threshold value, for which a predetermined value is assigned. M is an exponent, and in this embodiment, M=2 is assigned as a predetermined constant.

If each of the deviation evaluation amounts $e_1$ and $e_2$ is equal to or less than the deviation determining threshold value, the measured value is determined to be normal, so that the main control ECU 21 adopts the measured value as the value used for inverted pendulum control of the vehicle 10 (step S11-1-8), then terminates the process.

If the measured value is not normal and the deviation evaluation amount $e_2$ is greater than the deviation determining threshold value $e_{2,sh}$, it is determined that an abnormality is suspected, and the main control ECU 21 notifies the occupant 15 of a suspected abnormality condition (step S11-1-9). Specifically, the indicator lamp disposed on the input device 30 is lit up. The main control ECU 21 then adopts the measured value as the value used for inverted pendulum control of the vehicle 10 and terminates the process.

If the measured value is not normal and the deviation evaluation amount $e_1$ is greater than the deviation determining threshold value $e_{1,sh}$, it is determined that an urgent abnormality occurs, rather than a suspected abnormality, and the main control ECU 21 notifies the occupant 15 of an urgent abnormality condition (step S11-1-10). The main control ECU 21 then adopts the estimated value as the value used for inverted pendulum control of the vehicle 10 (step S11-1-11) and terminates the process.

In this embodiment, a comparison is made of a difference between the measured value and the estimated value to thereby detect that the measured value is abnormal. Specifically, an abnormality is determined using a power of an absolute value of the difference between the measured value and the estimated value. This allows a large deviation to be evaluated even more exaggeratedly, so that an abnormal condition can be determined even more appropriately. In addition, the abnormality determination is made using a value that is integrated with respect to a predetermined time. The determination is therefore independent of a transient and instantaneous deviation, so that an abnormal condition can be determined even more appropriately.

In this embodiment, if the measured value is determined to be abnormal, it is then determined, according to the degree of the abnormality, whether the measured value can be continuously used for controlling running of the vehicle and posture of the vehicle body. Specifically, if an average value of deviations over a relatively short period of determination time is much greater than a relatively large threshold value, it is considered that the measured value falls into an abnormal condition within a short period of time and the degree of abnormality is large. It is then determined that such condition is the "urgent abnormality" requiring to instantaneously stop using the measured value. In this case, subsequent control is performed based on the estimated value instead of the measured value. If an average value of deviations over a relatively long period of determination time is greater than a relatively small threshold value, it is considered that, although the measured value is being gradually aggravated toward an abnormal condition, the degree of abnormality is low at the present moment. It is then determined that the condition is the "suspected abnormality" requiring inspection and the like, but not an instantaneous stop of using the measured value. In this case, control is continuously performed based on the measured value, while a user is simply prompted by notification means to perform an inspection. By appropriately determining the degree of the abnormal condition in this manner, a convenient and safe inverted pendulum type vehicle can be provided that prevents convenience from being degraded by excessive abnormality determination and preventive safety from being degraded as a result of permitting an initial minor abnormality.

It is to be noted that, in this embodiment, a common value is used for a time-integrated threshold value or an exponent for two deviation evaluation amounts. A specific value may nonetheless be set for each. For example, by making the exponent large in the equation for determining the deviation evaluation amount for use in urgent abnormality determination, large and small deviations may be more markedly identified.

In this embodiment, the measured value is compared with the estimated value for the vehicle body inclination angle. The vehicle body inclination angular velocity that represents a rate of change of the vehicle body inclination angle may be considered. For example, the deviation evaluation amount may be found using a value acquired by adding each rate of change of the measured value and the estimated value multiplied by a predetermined time constant to the original measured value and estimated value. This allows transition to an abnormal condition to be detected more quickly or simply.

Additionally, in this embodiment, the abnormality determination is made at all times. However, the abnormality determination may nonetheless be temporarily suspended depending on vehicle conditions. For example, if the road surface sensor 71 detects a step, a value of the deviation evaluation amount may be fixed upon contact with the step or while the vehicle 10 is located near the step. This avoids a false recognition that a change in a state quantity because of the step is recognized as an abnormality.

The target running condition determining process, the target vehicle body posture determining process, and the actuator output determining process, which are subsequent processes, are the same as those of the first embodiment, and descriptions thereof will be omitted.

As described above, in this embodiment, the vehicle body inclination angle is estimated from the time history of the drive wheel rotation angular acceleration and the drive torque, the estimated value of the vehicle body inclination angle is corrected using the measured value of the vehicle body center-of-gravity deviation amount taken by the riding section sensor 61, and the vehicle body inclination angular acceleration is estimated using another dynamic model and corrected according to the running resistance estimated value. The measured value of the vehicle body inclination condition taken by the vehicle body inclination sensor 41 is compared with the estimated value. If the difference between the measured value and the estimated value of the vehicle body inclination angle is greater than a predetermined value, the vehicle body inclination angle measured value is considered to be abnormal. Abnormality in the vehicle body inclination angle measured value can thereby be reliably detected, so that the vehicle 10 of an inverted pendulum type offering greater safety and convenience at a lower cost can be provided.

In the fifth embodiment of the present invention, the following may be presented as means for solving the related art problems.

A vehicle includes a drive wheel rotatably attached to a vehicle body and a vehicle controller that controls posture of the vehicle body by controlling drive torque applied to the drive wheel, wherein the vehicle controller includes inclination measuring means for measuring an inclination angle relative to a vertical axis of the vehicle body, inclination estimating means for estimating the inclination angle using a rotational condition of the drive wheel and the drive torque, and determining means for determining that the inclination angle measured by the inclination measuring means is abnormal if an absolute value of a difference between the inclination angle measured by the inclination measuring means and the inclination angle estimated by the inclination estimating means is greater than a predetermined value.

In this configuration, an abnormality in the vehicle body inclination angle measured value can be reliably detected without preparing separately a sensor for verification purpose, so that a low-priced, safe inverted pendulum type vehicle can be achieved.

In another vehicle, the vehicle controller further includes notification means for notifying an abnormality, if the determining means determines that the inclination angle measured by the inclination measuring means is abnormal.

In this configuration, when the measured value is abnormal and even if the same operations as those when the measured value is normal are achieved as a result of control to respond to the abnormality, the occupant is properly notified that the vehicle body inclination angle measured value is abnormal and prompted to perform an inspection or repair procedure.

In still another vehicle, additionally, the determining means determines whether the inclination angle measured by the inclination measuring means can be used for posture control of the vehicle body, and if the determining means determines that the measured angle can be used, the vehicle controller determines a value of the drive torque according to the inclination angle measured by the inclination measuring means, and if the determining means determines that the measured value cannot be used, a value of the drive torque according to the inclination angle estimated by the inclination estimating means.

In this configuration, even if acquisition of the vehicle body inclination angle measured value becomes suddenly impossible during running in inverted posture, the running in inverted posture can be maintained, thus allowing limp-home running and the like.

In another vehicle, additionally, if the absolute value of the difference is greater than a first predetermined value and equal to or less than a second predetermined value, the determining means determines that the inclination angle measured by the inclination measuring means is abnormal, but can still be used for posture control of the vehicle body. If the absolute value of the difference is greater than the second predetermined value, the determination means determines that the inclination angle measured by the inclination measuring means is abnormal and cannot be used for posture control of the vehicle body.

In this configuration, an appropriate control method can be selected by determining whether the measured value or the estimated value of the vehicle body inclination angle is to be used according to the degree of abnormality of the measured value.

In still another vehicle, additionally, if a first time-integrated value that is a power of the absolute value of the difference integrated with respect to a first predetermined period of time is greater than a first predetermined integrated value and a second time-integrated value that is a power of the absolute value of the difference integrated with respect to a second predetermined period of time is equal to or less than a second predetermined integrated value, the determining means determines that the inclination angle measured by the inclination measuring means is abnormal, but can still be used for posture control of the vehicle body. If the second time-integrated value is greater than the second predetermined integrated value, the determining means determines that the inclination angle measured by the inclination measuring means is abnormal and cannot be used for posture control of the vehicle body.

In this configuration, an abnormal condition determination and a determination as to whether the measured value can be used can be appropriately made by using the time history of the measured value as a criterion for determination, and in addition, by setting two more different references.

In yet another vehicle, additionally, the determining means makes a determination based on the second predetermined period of time that is shorter than the first predetermined period of time, and the second predetermined integrated value that is such that the second predetermined integrated value divided by the second predetermined period of time is greater than the first predetermined integrated value divided by the first predetermined period of time.

In this configuration, a serious abnormality is detected within a short period of time, thereby expediting response to the serious abnormality. Furthermore, a minor abnormality that is difficult to be determined is determined based on data over a long period of time, so that accuracy in determining abnormalities can be enhanced.

In yet another vehicle, the vehicle controller further includes center-of-gravity deviation amount acquiring means for acquiring a deviation amount of the center-of-gravity position of the vehicle body, and the inclination estimating means corrects the estimated value of the inclination angle using the center-of-gravity deviation amount acquired by the center-of-gravity deviation amount acquiring means.

In this configuration, by considering the deviation in the center-of-gravity position of the vehicle body, accuracy in estimating the vehicle body inclination angle can be prevented from being degraded as a result of a difference in weight and posture of the occupant or weight and position of the article.

Yet another vehicle further includes a riding section on which the occupant rides and/or a heavy article is loaded and load distribution measuring means for measuring a load distribution of the riding section, and the center-of-gravity deviation amount acquiring means estimates the center-of-gravity deviation amount using the load distribution measured by the load distribution measuring means.

In this configuration, by measuring the load distribution of the riding section, the center-of-gravity position of the vehicle body can be accurately identified, so that effects from deviation in the center-of-gravity position can be accurately compensated for.

In yet another vehicle, the vehicle controller further includes resistance parameter acquiring means for acquiring a resistance parameter that represents a characteristic amount of the running resistance of the vehicle, and the inclination estimating means corrects the estimated value of the inclination angle using the resistance parameter acquired by the resistance parameter acquiring means.

In this configuration, effects from the running resistance are taken into consideration when the estimated value of the vehicle body inclination angular acceleration based on the dynamic model relating to rotational movement of the drive wheel is used for estimating the vehicle body inclination angle, which allows the vehicle body inclination angular acceleration and the vehicle body inclination angle to be estimated with even higher accuracy.

Yet another vehicle additionally includes road surface shape measuring means for measuring a road surface shape, and the resistance parameter acquiring means estimates the resistance parameter using the road surface shape measured by the road surface shape measuring means.

In this configuration, by measuring the road surface shape, characteristics of the running resistance can be estimated even more accurately, so that effects from the running resistance can be properly compensated for.

A sixth embodiment of the present invention will be described below.

In the related art vehicle described in "BACKGROUND ART", running of the vehicle and posture of the vehicle body are controlled using the measured value of the rotational condition of the drive wheel acquired by a sensor. If a correct measured value cannot be acquired as the measured value, specifically, in the case of an abnormal condition, it becomes necessary to detect the abnormality and perform control in response to the abnormal condition. For example, if a sensor fails, the measured value of the sensor may be determined to be abnormal when a signal indicative of an abnormal condition transmitted from the sensor is received.

However, if an abnormal measured value is acquired because of, for example, noise trapped in the sensor output signal, the abnormality cannot be detected because such abnormality is not caused by a failure of the sensor itself.

In preparation for such a situation, it is conceivable that a plurality of sensors is prepared in advance, and the measured value may be determined to be normal through a cross-reference of measured values taken by the different sensors. However, providing a plurality of sensors makes a system costly and complicated. Specifically, it is difficult for a low-priced, simple system to assure sufficient safety and convenience.

It is an object of the sixth embodiment of the present invention to solve the above-described problems of the related art vehicles and to provide a safer, more convenient, and lower-priced vehicle that detects reliably an abnormality of the measured value of the drive wheel rotational condition by comparing the measured value with the estimated value of the drive wheel rotational condition.

Parts of the same configurations as those in the first to fifth embodiments are denoted by the same reference numerals, and descriptions of those parts will be omitted. Descriptions of the same operations and the same effects as in the first through fifth embodiments will also be omitted.

The main control ECU 21 in this embodiment functions as rotation estimating means for estimating the rotational condition of the drive wheel 12. In addition, the main control ECU 21 also functions as determining means for determining whether it is possible to acquire the measured value of the rotational condition of the drive wheel 12 and use the measured value for control, resistance parameter acquiring means for acquiring the running resistance parameter, and center-of-gravity deviation amount acquiring means for acquiring the vehicle body center-of-gravity deviation amount.

Configurations in other respects are the same as those of the fifth embodiment and descriptions thereof will be omitted.

Operation of the vehicle 10 having the foregoing configuration will be described below. First, an overview of a running and posture control process will be described.

In this embodiment, the measured value of the drive wheel rotational condition taken by the drive wheel sensor 51 is compared with the estimated value to thereby detect an abnormality in the measured value of the drive wheel rotation angular velocity. Specifically, the drive wheel rotation angular velocity is estimated from the time history of the vehicle body inclination angular acceleration and the drive torque. The estimated value of the drive wheel rotation angular velocity is corrected using the measured value of the vehicle body center-of-gravity deviation amount taken by the riding section sensor 61. Furthermore, the drive wheel rotational angular acceleration is estimated using another dynamic model and corrected according to a running resistance estimated value. Then, if a difference between the measured value and the estimated value of the drive wheel rotation angular velocity is greater than a predetermined value, the measured value of the drive wheel rotation angular velocity is regarded as being abnormal. This allows the abnormality in the measured value of the drive wheel rotation angular velocity to be reliably detected, so that the vehicle 10 of an inverted pendulum type offering greater safety and convenience at a lower cost can be provided.

Operations of the running and posture control process are the same as those of the fifth embodiment, and descriptions thereof will be omitted.

Operations of the state quantity acquiring process are also the same as those of the fifth embodiment, and descriptions thereof will be omitted.

The main state quantity acquiring process will be described below.

Figure 19:
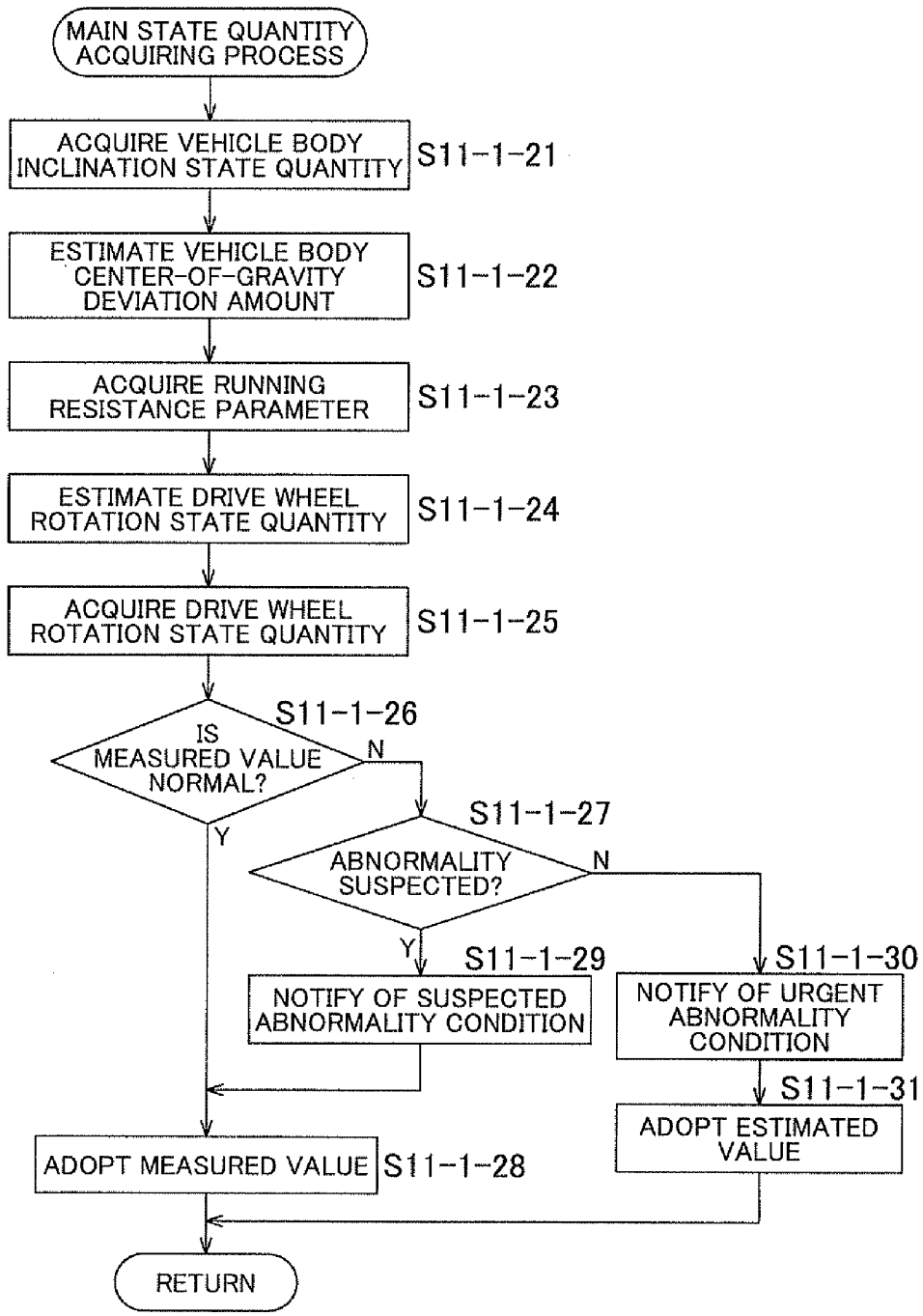
FIG. 19 is a flow chart showing operations of a main state quantity acquiring process for in a sixth embodiment of the present invention.

FIG. 19 is a flow chart showing operations of the main state quantity acquiring process in the sixth embodiment of the present invention.

In the main state quantity acquiring process, the main control ECU 21 first acquires the vehicle body inclination state quantity (step S11-1-21). In this case, the vehicle body inclination angle $\theta_1$ and/or the inclination angular velocity $\dot{\theta}_1$ are acquired from the vehicle body inclination sensor 41.

Operations performed by the main control ECU 21 to estimate the vehicle body center-of-gravity deviation amount and the running resistance parameter, specifically, operations in steps S11-1-22 and S11-1-23 are the same as those in steps S11-1-2 and S11-1-3 of the fifth embodiment and descriptions thereof will be omitted.

After the running resistance parameter is acquired, the main control ECU 21 estimates the drive wheel rotation state quantity (step S11-1-24). Specifically, from the time history of each state quantity and the drive torque, and each estimated parameter, the drive wheel rotation angular velocity is estimated using Expression (16) as follows.

[Numerical Expression 16]

$$\dot{\theta}_W = \dot{\theta}_W^{(n)}$$
$$\dot{\theta}_W^{(n)} = \zeta_W \tilde{\dot{\theta}}_W + (1 - \zeta_W)\dot{\theta}_W^{(n-1)}$$
$$\tilde{\dot{\theta}}_W = \frac{\tilde{\tau}_D - \tau_{D0}}{C_D}$$
$$\tilde{\tau}_D = \tau_W - \tau_{D,M}$$
$$\tau_{D,M} = R_W(\tilde{M} R_W \hat{\ddot{\theta}}_W + m_1 l_1 \ddot{\theta}_1)$$
$$\hat{\ddot{\theta}}_W = \frac{1}{m_1 l_1 R_W}\{-\tau_W - I_1 \ddot{\theta}_1 + m_1 g l_1(\theta_1 + \delta_1)\}$$

Expression (16)

where, the second equation in Expression (16) corresponds to a process of low-pass filtering. In the expression, $\zeta_W$ is a filter coefficient and $\zeta_W = \Delta t/T_W$ holds. It is to be noted that $T_W$ is a low-pass filter time constant. $\Delta t$ and $T_W$ are both predetermined values.

Additionally, $\tilde{\dot{\theta}}_W$ of the third equation denotes a drive wheel rotation angular velocity estimated instantaneous value and $\tau_{D0}$, and $C_D$ are running resistance parameters under the normal condition. Furthermore, $\tilde{\tau}_D$ in the fourth equation denotes a running resistance torque estimated instantaneous value, and $\tau_{D,M}$ of the fifth equation denotes a model-estimated running resistance torque.

Furthermore, $\hat{\ddot{\theta}}_W$ denotes a drive wheel rotation angular acceleration estimated value, and $\delta_1$ denotes the vehicle body center-of-gravity deviation amount under the normal condition.

In this embodiment, the drive wheel rotation angular velocity is estimated based on the dynamic model relating to rotational movement of the drive wheel 12, using the time history of the vehicle body inclination condition and the drive torque, and the parameter estimated value. At this time, the running resistance torque is estimated, with the drive torque, inertia relative to acceleration and deceleration of the vehicle 10, effects from movement of the center of gravity as a result of vehicle body inclination, and the running resistance torque taken into consideration, and from a relationship in magnitude thereof. The drive wheel rotation angular velocity is then estimated on the assumption that a linear relationship holds between the running resistance torque and the drive wheel rotation angular velocity. In this manner, an unknown drive wheel rotation angular velocity can be estimated by using theoretical relationships between different conditions in the dynamic model and torque.

The estimated value of the drive wheel rotation angular velocity is determined using the measured value of the running resistance parameter. Specifically, accuracy of the estimation is improved by acquiring, through measurement, characteristics of the running resistance torque corresponding to a deviation from the dynamic model relating to rotational movement of the drive wheel 12. This makes it possible to prevent effects from the running resistance from being recognized as an abnormal error of the measured value of the drive wheel rotational condition, thereby allowing an even more reliable abnormality determination.

Furthermore, the drive wheel rotation angular acceleration is estimated using another dynamic model. Specifically, the drive wheel rotation angular acceleration is regarded as a state quantity independent of the drive wheel rotation angular velocity, and the estimation is made using the dynamic model relating to vehicle body, tilting movement. At this time, gravitational torque, vehicle body rotational inertia, an inertia force involved in acceleration and deceleration of the vehicle and anti-torque of the drive torque are taken into consideration. By estimating the drive wheel rotation angular acceleration using another model in this manner, accumulation of errors involved in integration of the acceleration and making the estimating calculation unsteady can be avoided, so that a stable and highly accurate estimation of the drive wheel rotation angular velocity is achieved.

In this embodiment, the drive wheel rotation angular velocity is estimated using a simple linear model. However, the estimation may be made using an even stricter model. For example, a model that takes into account a nonlinear effect and an element such as viscous resistance to vehicle body rotation may be used for even stricter estimation. Alternatively, the estimation may also be made using an even simpler model.

Then, the main control ECU 21 acquires the drive wheel rotation state quantity (step S11-1-25).

Specifically, the drive wheel rotational angle $\theta_W$ and/or the rotation angular velocity $\dot{\theta}_W$ are acquired from the drive wheel sensor 51.

Next, the main control ECU 21 determines whether the measured value is normal (step S11-1-26). When it is determined that the measured value is not normal, the main control ECU 21 further determines whether the measured value is suspected to be abnormal (step S11-1-27). Specifically, the measured value is compared with the estimated value to find a deviation between the measured value and the estimated value using Expression (17) as follows, deviation evaluation amounts $e_1$ and $e_2$ for the deviation found are calculated using Expression (18) as follows, and it is then determined whether the measured value is normal, and is suspected to be abnormal, based on the calculated deviation evaluation amounts.

[Numerical Expression 17]

$$e^{(k)} = \theta_{W,S}^{(k)} - \theta_{W,E}^{(k)} \qquad \text{Expression (17)}$$

where, $\theta_{W,S}^{(k)}$ is a vehicle body inclination angle measured value, and $\theta_{W,E}^{(k)}$ is a vehicle body inclination angle estimated value.

$$e_1 = \frac{1}{N_1} \sum_{k=n-N_1+1}^{n} |e^{(k)}|^M \qquad \text{Expression (18)}$$

$$e_2 = \frac{1}{N_2} \sum_{k=n-N_2+1}^{n} |e^{(k)}|^M$$

It is to be noted that $$N_1 = \frac{T_1}{\Delta t} \text{ and } N_2 = \frac{T_2}{\Delta t}.$$

$\Delta t$ is a data acquiring interval (control processing cycle) and $T_1$ and $T_2$ are deviation determining time (predetermined value). It is preferable that, $T_1 < T_2$ hold with respect to $T_1$ and $T_2$, and, for example, $T_1$ is set to 0.1 [sec.] and $T_2$ is set to 10 [sec.].

If $e_1 > e_{1,sh}$ holds, it is determined that an urgent abnormality occurs, and if $e_2 > e_{2,sh}$ holds, it is determined that an abnormality is suspected. It is to be noted that $e_{1,sh}$ and $e_{2,sh}$ denote deviation determining threshold values and $$e_{1,sh} = \frac{S_{sh}}{T_1} \text{ and } e_{2,sh} = \frac{S_{sh}}{T_2}$$

hold.

In these expressions, $S_{sh}$ is a time integration threshold value, for which a predetermined value is assigned. M is an exponent, and in this embodiment, M=2 is assigned as a predetermined constant.

Operations subsequent to the main state quantity acquiring process to adopt the measured value, to notify of a suspected abnormality condition, to notify of an urgent abnormality condition, and to adopt the estimated value, specifically, operations in steps S11-1-28 to S11-1-31, are the same as those in steps S11-1-8 to S11-1-11, and descriptions thereof will be omitted.

The target running condition determining process, the target vehicle body posture determining process, and the actuator output determining process are the same as those of the first embodiment, and descriptions thereof will be omitted. It is to be noted that, in this embodiment, whether the control is performed based on the measured value of the drive wheel rotation angular velocity by the drive wheel sensor 51 or the estimated value of the drive wheel rotation angular velocity by the rotation estimating means, specifically, regardless of whether the drive wheel rotation angular velocity measured value can be acquired or not, the running and posture control is performed according to the control law identical to that shown in Expression (6) in the first embodiment. This simplifies the control law, so that labor spent in designing a control system and in programming and calculation cost incurred during control operations can be significantly reduced.

As described above, in this embodiment, the drive wheel rotation angular velocity is estimated based on the time history of the vehicle body inclination condition and the drive torque, and the parameter estimated value. The estimated value of the drive wheel rotation angular velocity is then determined using the measured value of the running resistance parameter. Furthermore, the drive wheel rotation angular acceleration is estimated using another dynamic model and corrected using the estimated value of the vehicle body center-of-gravity deviation amount. The measured value is then determined to be abnormal, if the difference between the measured value and the estimated value of the drive wheel rotation angular velocity is equal to or more than a predetermined value. This allows an abnormality in the measured value of the drive wheel rotational condition to be reliably detected, so that the vehicle 10 of an inverted pendulum type offering greater safety and convenience at a lower cost can be provided.

In the sixth embodiment of the present invention, the following may be presented as means for solving the related art problems.

A vehicle includes a drive wheel rotatably attached to a vehicle body and a vehicle controller that controls posture of the vehicle body by controlling drive torque applied to the drive wheel, wherein the vehicle controller includes rotation measuring means for measuring a rotation angular velocity of the drive wheel, rotation estimating means for estimating a rotation angular velocity of the drive wheel using an inclination condition of the vehicle body relative to a vertical axis and the drive torque, and determining means for determining that the rotation angular velocity measured by the rotation measuring means is abnormal, if an absolute value of a difference between the rotation angular velocity measured by the rotation measuring means and the rotation angular velocity estimated by the rotation estimating means is greater than a predetermined value.

In this configuration, an abnormality in the measured value of the rotation angular velocity of the drive wheel can be reliably detected without preparing separately a sensor for verification purpose, so that a low-priced, safe inverted pendulum type vehicle can be achieved.

In another vehicle, the vehicle controller further includes notification means for notifying an abnormality, if the determining means determines that the rotation angular velocity measured by the rotation measuring means is abnormal.

In this configuration, when the measured value is abnormal, even if the same operations as those when the measured value is normal are achieved as a result of control to respond to the abnormality, the occupant is properly notified that the drive wheel rotation angular velocity measured value is abnormal and prompted to perform an inspection or repair procedure.

In still another vehicle, additionally, the determining means determines whether the rotation angular velocity measured by the rotation measuring means can be used for posture control of the vehicle body. If the determining means determines that the rotation angular velocity can be used, the vehicle controller determines a value of the drive torque according to the rotation angular velocity measured by the rotation measuring means, and if the determining means determines that the rotation angular velocity cannot be used, a value of the drive torque according to the rotation angular velocity estimated by the rotation estimating means.

In this configuration, even if acquisition of the drive wheel rotation angular velocity measured value suddenly becomes impossible during running in inverted posture, the running in inverted posture can be maintained, thus allowing limp-home running and the like.

In another vehicle, additionally, if the absolute value of the difference is greater than a first predetermined value and equal to or less than a second predetermined value, the determining means determines that the rotation angular velocity measured by the rotation measuring means is abnormal, but can still be used for posture control of the vehicle body. If the absolute value of the difference is greater than the second predetermined value, the determining means determines that the rotation angular velocity measured by the rotation measuring means is abnormal and cannot be used for posture control of the vehicle body.

In this configuration, an appropriate control method can be selected by determining whether the measured value or the estimated value of the drive wheel rotation angular velocity is to be used according to the degree of abnormality of the measured value.

In still another vehicle, additionally, if a first time-integrated value that is a power of the absolute value of the difference integrated with respect to a first predetermined period of time is greater than a first predetermined integrated value and a second time-integrated value that is a power of the absolute value of the difference integrated with respect to a second predetermined period of time is equal to or less than a second predetermined integrated value, the determining means determines that the rotation angular velocity measured by the rotation measuring means is abnormal, but can still be used for posture control of the vehicle body. If the second time-integrated value is greater than the second predetermined integrated value, the determining means determines that the rotation angular velocity measured by the rotation measuring means is abnormal and cannot be used for posture control of the vehicle body.

In this configuration, an abnormal condition determination and a determination as to whether the measured value can be used can be appropriately made by using the time history of the measured value as a criterion for determination, and in addition, by setting two more different references.

In yet another vehicle, additionally, the determining means makes a determination based on the second predetermined period of time that is shorter than the first predetermined period of time, and the second predetermined integrated value that is such that the second predetermined integrated value divided by the second predetermined period of time is greater than the first predetermined integrated value divided by the first predetermined period of time.

In this configuration, a serious abnormality is detected within a short period of time, thereby expediting response to the serious abnormality. Furthermore, a minor abnormality that is difficult to be determined is determined based on data over a long period of time, so that accuracy in determining abnormalities can be enhanced.

In yet another vehicle, the vehicle controller further includes resistance parameter acquiring means for acquiring a resistance parameter that represents a characteristic amount of the running resistance of the vehicle, and the rotation estimating means corrects the estimated value of the rotation angular velocity using the resistance parameter acquired by the resistance parameter acquiring means.

In this configuration, effects from the running resistance are taken into consideration, so that accuracy in estimating the drive wheel rotation angular velocity can be prevented from being degraded as a result of a difference in gradient or roughness of the running road surface.

Yet another vehicle additionally includes road surface shape measuring means for measuring a road surface shape, and the resistance parameter acquiring means estimates the resistance parameter using the road surface shape measured by the road surface shape measuring means.

In this configuration, by measuring the road surface shape, characteristics of the running resistance can be estimated even more accurately, so that effects from the running resistance can be properly compensated for.

In yet another vehicle, the vehicle controller further includes center-of-gravity deviation amount acquiring means for acquiring a deviation amount of the center-of-gravity position of the vehicle body, and the rotation estimating means corrects the estimated value of the rotation angular velocity using the center-of-gravity deviation amount acquired by the center-of-gravity deviation amount acquiring means.

In this configuration, deviation in the center-of-gravity position of the vehicle body is considered when the estimated value of the drive wheel rotation angular velocity based on the dynamic model of the vehicle body inclination condition is used for estimating the drive wheel rotation angular velocity. This allows an even more accurate estimation of the drive wheel rotation angular acceleration and the drive wheel rotation angular velocity.

Yet another vehicle additionally includes a riding section on which the occupant rides and/or a heavy article is loaded and load distribution measuring means for measuring a load distribution of the riding section, and the center-of-gravity deviation amount acquiring means estimates the center-of-gravity deviation amount using the load distribution measured by the load distribution measuring means.

In this configuration, by measuring the load distribution of the riding section, the center-of-gravity position of the vehicle body can be accurately identified, so that effects from deviation in the center-of-gravity position can be accurately compensated for.

It should be understood that the present invention is not limited to the foregoing embodiments, and may be modified in various forms within the spirit and scope of the invention. The modifications shall not be excluded from the scope of the invention.

INDUSTRIAL APPLICABILITY

The present invention may be applied to a vehicle incorporating posture control of the inverted pendulum.

Description of the Reference Numerals
10: Vehicle
12: Drive Wheel
20: Control ECU
21: Main Control ECU
41: Vehicle Body Inclination Sensor

The invention claimed is:
1. A vehicle comprising:
a drive wheel rotatably attached to a vehicle body; and
a vehicle controller that controls posture of the vehicle body by controlling drive torque applied to the drive wheel, wherein:
the vehicle controller includes an inclination estimating unit configured to estimate an inclination angle of the vehicle body relative to a vertical axis using a rotational condition of the drive wheel and the drive torque and a target value determining unit configured to determine a target value of the inclination angle of the vehicle body in accordance with a target movement of the vehicle; and
the drive torque is applied with a magnitude proportional to a difference between the estimated value estimated by the inclination estimating unit and the target value determined by the target value determining unit.

2. The vehicle according to claim 1, wherein the vehicle controller is configured to determine the drive torque applied to the drive wheel using an estimated value of the inclination angle of the vehicle body estimated by the inclination estimating unit.

3. The vehicle according to claim 1, wherein
the vehicle controller further includes:
an inclination measuring unit configured to measure the inclination angle of the vehicle body; and
a determining unit configured to determine whether it is possible to acquire a measured value measured by the inclination measuring unit and/or to use the measured value for control of the vehicle, and
the inclination estimating unit is configured to estimate the inclination angle of the vehicle body if the determining unit determines that the acquisition and/or the use of the measured value is impossible.

4. The vehicle according to claim 3, wherein the vehicle controller is configured to determine the drive torque using the measured value of the inclination angle of the vehicle body if the determining unit determines that the acquisition and/or the use of the measured value is possible, and the vehicle controller is configured to determine the drive torque using the estimated value of the inclination angle of the vehicle body if the determining unit determines that the acquisition and/or the use of the measured value is impossible.

5. The vehicle according to claim 4, wherein the vehicle controller is configured to apply the drive torque with a magnitude proportional to a difference between the measured value and the target value of the inclination angle of the vehicle body if the determining unit determines that the acquisition and/or the use of the measured value is possible, and the drive torque with a magnitude proportional to a difference between the estimated value and the target value of the inclination angle of the vehicle body if the determining unit determines that the acquisition and/or the use of the measured value is impossible.

6. The vehicle according to claim 1, wherein
the vehicle controller further includes a center-of-gravity deviation amount acquiring unit configured to acquire a center-of-gravity position deviation amount of the vehicle body, and
the inclination estimating unit is configured to correct the estimated value of the inclination angle of the vehicle body using the center-of-gravity deviation amount acquired by the center-of-gravity deviation amount acquiring unit.

7. The vehicle according to claim 6, wherein the center-of-gravity deviation amount acquiring unit is configured to estimate the center-of-gravity deviation amount using the rotational condition of the drive wheel and/or the drive torque and/or the measured value of the inclination angle of the vehicle body.

8. The vehicle according to claim 6, wherein the center-of-gravity deviation amount acquiring unit is configured to determine the latest center-of-gravity deviation amount when the determining unit determines that the acquisition and/or the use of the measured value is possible to be the center-of-gravity deviation amount if the determining unit determines that the acquisition and/or the use of the measured value is impossible.

9. The vehicle according to claim 1, wherein the vehicle controller further includes an inclination angular acceleration estimating unit configured to estimate inclination angular acceleration of the vehicle body using the rotational condition of the drive wheel and the drive torque, and the estimated value of the inclination angle of the vehicle body is corrected using an estimated value of the inclination angular acceleration estimated by the inclination angular acceleration estimating unit.

10. The vehicle according to claim 9, wherein
the vehicle controller further includes a resistance parameter acquiring unit configured to acquire a parameter relating to running resistance of the vehicle, and
the inclination estimating unit is configured to correct the estimated value of the inclination angular acceleration using the resistance parameter acquired by the resistance parameter acquiring unit.

11. The vehicle according to claim 10, wherein the resistance parameter acquiring unit is configured to estimate the resistance parameter using the rotational condition of the drive wheel and/or the drive torque and/or the measured value of the inclination angle of the vehicle body.

12. The vehicle according to claim 10, wherein the resistance parameter acquiring unit is configured to determine the latest resistance parameter when the determining unit determines that the acquisition and/or the use of the measured value is possible to be the resistance parameter if the determining unit determines that the acquisition and/or the use of the measured value is impossible.

* * * * *